(12) United States Patent
Sugawara

(10) Patent No.: US 7,986,619 B2
(45) Date of Patent: Jul. 26, 2011

(54) PACKET NETWORK SYSTEM

(75) Inventor: Eiji Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 12/149,376

(22) Filed: Apr. 30, 2008

(65) Prior Publication Data
US 2009/0003199 A1 Jan. 1, 2009

(30) Foreign Application Priority Data
Jun. 29, 2007 (JP) ................................ 2007-173011

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. ......... 370/222; 370/249; 370/258; 370/403

(58) Field of Classification Search .................... None
See application file for complete search history.

(56) References Cited

U.S. PATENT DOCUMENTS

| | | | |
|---|---|---|---|
| 2004/0153700 A1* | 8/2004 | Nixon et al. | 714/4 |
| 2006/0092856 A1 | 5/2006 | Mitsumori | |
| 2006/0120279 A1* | 6/2006 | Mitsumori | 370/218 |
| 2007/0104093 A1* | 5/2007 | Li et al. | 370/223 |
| 2008/0259920 A1* | 10/2008 | Cheng et al. | 370/390 |

FOREIGN PATENT DOCUMENTS
JP  2006-129071  5/2006

* cited by examiner

*Primary Examiner* — Xavier Szewai Wong
(74) *Attorney, Agent, or Firm* — Fujitsu Patent Center

(57) ABSTRACT

A system enabling inter-ring network connection when a plurality of ring networks are connected via a redundancy network, that is, a packet network system configured by a plurality of ring networks and redundancy networks linking the plurality of ring networks. This system virtually defines a plurality of virtual resilient packet ring networks among all of these packet networks and transfers packets on a designated virtual resilient packet ring network. Here, each virtual resilient packet ring network is identified by a virtual resilient packet ring network identifier allocated to each.

17 Claims, 24 Drawing Sheets

FIG. 9

| VRPR#A | HOP NUMBER | ADDRESS | |
|---|---|---|---|
| | 6 | #1A | CLOCKWISE DIRECTION |
| | 5 | #1G | |
| | 4 | #1F | |
| | 3 | #1E | |
| | 2 | #1D | |
| | 1 | #1C | |
| | 0 | #1B | SELF NODE |
| | 1 | #1A | COUNTER-CLOCKWISE DIRECTION |
| | 2 | #1G | |
| | 3 | #1F | |
| | 4 | #1E | |
| | 5 | #1D | |
| | 6 | #1C | |

| VRPR#C | HOP NUMBER | ADDRESS | |
|---|---|---|---|
| | 11 | #1A | CLOCKWISE DIRECTION |
| | 10 | #1G | |
| | 9 | #2B | |
| | 8 | #2A | |
| | 7 | #2G | |
| | 6 | #2F | |
| | 5 | #2E | |
| | 4 | #2D | |
| | 3 | #1E | |
| | 2 | #1D | |
| | 1 | #1C | |
| | 0 | #1B | SELF NODE |
| | 1 | #1A | COUNTER-CLOCKWISE DIRECTION |
| | 2 | #1G | |
| | 3 | #2B | |
| | 4 | #2A | |
| | 5 | #2G | |
| | 6 | #2F | |
| | 7 | #2E | |
| | 8 | #2D | |
| | 9 | #1E | |
| | 10 | #1D | |
| | 11 | #1C | |

FIG.11

| VRPR#A | HOP NUMBER | ADDRESS | |
|---|---|---|---|
| | 6 | #1A | CLOCKWISE DIRECTION |
| | 5 | #1G | |
| | 4 | #1F | |
| | 3 | #1E | |
| | 2 | #1D | |
| | 1 | #1C | |
| | 0 | #1B | SELF NODE |
| | 1 | #1A | COUNTER-CLOCKWISE DIRECTION |
| | 2 | #1G | |
| | 3 | #1F | |
| | 4 | #1E | |
| | 5 | #1D | |
| | 6 | #1C | |

| VRPR#C | HOP NUMBER | ADDRESS | |
|---|---|---|---|
| | — | — | CLOCKWISE DIRECTION |
| | — | — | |
| | — | — | |
| | — | — | |
| | — | — | |
| | — | — | |
| | 3 | #1E | |
| | 2 | #1D | |
| | 1 | #1C | |
| | 0 | #1B | SELF NODE |
| | 1 | #1A | COUNTER-CLOCKWISE DIRECTION |
| | 2 | #1G | |
| | 3 | #2B | |
| | 4 | #2A | |
| | 5 | #2G | |
| | 6 | #2F | |
| | 7 | #2E | |
| | 8 | #2D | |
| | — | — | |
| | — | — | |

FIG.17

| Vers | Diag | Sta | P | F | C | A | D | R | Detect Mult | Length |
|---|---|---|---|---|---|---|---|---|---|---|
| My Discriminator ||||||||||||
| Your Discriminator ||||||||||||
| Desired Min TX Interval ||||||||||||
| Required Min RX Interval ||||||||||||
| Required Min Echo RX Interval ||||||||||||

PACKET NETWORK SYSTEM

BACKGROUND

1. Field

The present invention relates to a packet network system, more particularly relates to a packet network system achieving an improvement of the restoration ability from a suspension of communication services due to a node failure of communications devices (nodes) configuring a communications network and disasters etc. of a station buildings containing the nodes and improving flexibility of a network design and to a node of the same.

2. Description of the Related Art

In recent years, due to the increase of traffic over the Internet using the Ethernet® or IP (Internet protocol) packets, the rapid increase of ADSL (asymmetric digital subscriber line) users, and further the rise of VoIP (voice over IP) technology, in place of the conventional ring networks configured by SONET/SDH (synchronous optical network/synchronous digital hierarchy) apparatuses, attention has begun to be paid to networks of packet rings designed to directly process packets on a ring network and secure a packet band management and statistical multiplexing effect, that is, packet ring networks (hereinafter also simply referred to as "rings").

In particular, in networks in city areas, the attention being paid to packet ring networks has become extremely high. For this reason, in the IEEE as well, standardization is proceeding in the IEEE802.17. Such recent packet rings are generally referred to as RPRs (packet rings) for distinguishing them from conventional token rings and FDDI (fiber distributed data interface) rings. Incidentally, RPRs use SRPs (spatial reuse protocols) already released by Cisco Co. Ltd. and have following features 1) to 5):

1) Support for bidirectional duplex ring networks;
2) Support for MAC (media access control) layers (layer 2);
3) High rate of effective use of used band;
4) Easy plug & play; and
5) Short switching time to a normal ring of within 50 ms at the time of failure.

As a packet ring network, below an explanation will be given of a RPR as a principal preferred example.

Note that, as known technologies related to the present invention, there are Japanese Patent Publication (A) No. 2006-129071 and IEEE802.17 draft V3.3. Japanese Patent Publication (A) No. 2006-129071 discloses communication by adding an apparatus recognition ID into an ATD frame of an RPR packet and identifying a node from a number of hops and a topology table. On the other hand, IEEE802.17 draft V3.3 is the standard of RPR.

FIG. 21 is a diagram showing a conventional RPR network. An RPR network 10 shown in the figure is a network with nodes #a to #f connected in a ring by an inside communication route 11*i* and an outside communication route 11*o*. Namely, the RPR network 10 employs a duplex ring configuration. Even if a failure occurs in one of the inside communication route 11*i* and outside communication route 11*o*, it is possible to continue communication by retransmitting the packet data by the other communication route.

The nodes #a to #f mainly function to send packet data. Each is configured by a transmission device, bridge node, router, server, RPR dedicated device, etc.

FIG. 22 is a diagram showing an example of the configuration of a network system using a conventional RPR network. This network 10 is a network configured by a network provider. User networks 51 and 52 are networks of end users. These user networks 51 and 52 are connected to each other via nodes #b and #e of the network 10.

A packet from the user network 51 is transmitted encapsulated into an RPR packet including an RPR header at the node #b. When the node #e receives this, the RPR header is removed and the remainder is transferred to the user network 52. Note that in such mode of utilization, a packet from the user network 51 is transferred to the node #e, while a packet from the user network 52 is transferred to the node #b. This is set for the nodes #b and #e in advance based on contracts between the users and the network providers (IEEE802.17 draft V3.3).

FIG. 23 is a diagram showing an example of the configuration of a network system comprised of two user networks connected to two different RPR networks. A packet from the user network 51 is transferred to the node #e by the RPR network 10, passes through a relay network 30, then is relayed to a node #i of an RPR network 201, transferred via a communication route 21*i* (or 21*o*) to a node #1, then arrives at the destination user network 52. Here, a packet transferred over the network 30 between the RPR network 10 and the RPR network 20 is an ordinary packet not having an RPR header. In this case, if assuming that the node #e or #i fails, the relay network 30 is disconnected, therefore the communications service between the user networks 51 and 52 is suspended.

Therefore, redundancy (node redundancy) of the nodes #e and #i of FIG. 23 and a redundancy network for connecting the redundant nodes become necessary. This is shown in FIG. 24. The figure is a diagram showing an example of the configuration of a network system using an inter-RPR network connection including node redundancy. The redundancy network is indicated by reference numeral 10.

However, the functions concerning such node redundancy is not prescribed in the standard RPR (IEEE802.17 draft V3.3). This is the problem.

SUMMARY

Accordingly, in consideration of the above problem, an object of the present invention is to provide a packet network system enabling inter-RPR ring network connection including a node redundancy configuration, and a gateway node, an interface node, and a relay node for this purpose.

To attain the above object, one aspect of an embodiment enables inter-ring network connection when connecting a plurality of ring networks via redundancy networks. For this purpose, it provides a packet network system configured by a plurality of ring networks (#1, #2) and redundancy networks (#3, #4) for linking the plurality of ring networks. A plurality of virtual resilient packet ring networks (#A, #B, #C) are virtually defined in these packet networks. Packets are transferred on a designated virtual resilient packet ring network. Here, each virtual resilient packet ring network is identified by a virtual resilient packet ring network identifier assigned to each.

BRIEF DESCRIPTION OF THE DRAWINGS

The above object and features will be more apparent from the following description of the preferred embodiments given with reference to the accompanying drawings, wherein:

FIG. 9 is a diagram showing a ring topology table of an interface node #1B as an example;

FIG. 11 is a diagram showing a situation of rewriting the content of the ring topology table due to a failure;

FIG. 17 is a diagram showing a format of a BFD packet used as a keep alive packet;

DESCRIPTION OF THE PREFERRED EMBODIMENTS

Preferred embodiments of the present invention will be described in detail below while referring to the attached figures.

In an embodiment of the present invention, first the idea of a virtual ring network identifier is introduced. This is an ID of a virtual RPR (abbreviated as VRPR ID). The characteristic feature resides in transmitting a packet including this ID in the RPR packet header on the network and thereby configuring a plurality of virtual RPR networks (VRPR networks) on the network.

Each node (#a, #b . . . ) on the network can recognize as to on which VRPR network, among the plurality of VRPR networks, the packet is being transmitted, by recognizing the VRPR ID in the RPR packet header.

For this reason, each node (#a, #b . . . ) individually constructs a ring topology table for each VRPR network and is provided with an RPR control function for each VRPR. Further, the interface node accommodating the user network (51, 52 . . . ) is provided with a user network interface for transmitting a packet from the user network to the VRPR network set in advance and, at the same time, receiving a packet from this VRPR network. Further, the gateway node for performing the connection between rings is provided with a VRPR relay function for relaying a VRPR packet to the RPR interface set in advance.

Furthermore, in another embodiment, a node arranged in a packet network may be configured to have an individual RPR switch function for each VRPR as well.

Further, in another embodiment, the user network interface may be configured to have a selection function of selecting a different VRPR network in a case where a failure occurs in a VRPR network being selected, by enabling a designation of a plurality of VRPR networks for transmitting and receiving packets.

Thus, according to one aspect of the embodiments, a packet network having a high redundancy without depending upon a physical network topology can be flexibly constructed.

Embodiment 1

Figure 1:
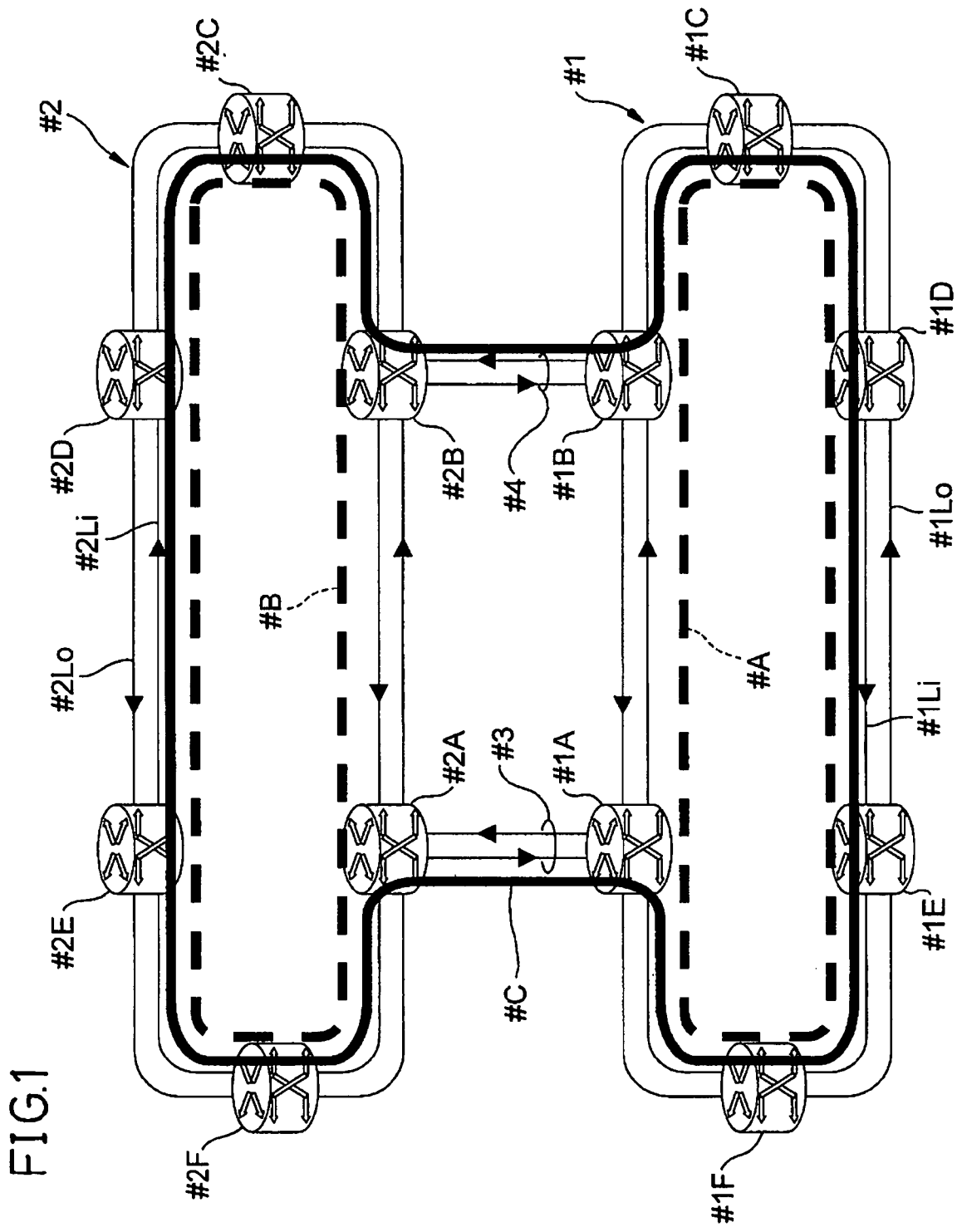
FIG. 1 is a diagram for explaining in brief an Embodiment 1.

FIG. 1 is a diagram for explaining in brief Embodiment 1. First, if generally defining the packet network system based on the embodiment, this is a packet network system configured by a plurality of ring networks (#1, #2) which are independently constructed and transfer packets and at least one redundancy network (#3, #4) for linking these plurality of ring networks, wherein a plurality of virtual resilient packet ring (VRPR) networks (#A, #B, #C) are virtually defined in all packet networks configured by both the above plurality of ring networks (#1, #2) and the redundancy networks (#3, #4), and the above packets are transferred through a designated virtual resilient packet ring (VRPR) network.

FIG. 1 shows a network forming a node redundancy between the ring network #1 and the ring network #2 and connecting the ring networks to each other by gateway nodes. The gateway nodes in the figure are #1A, #1B, #2A, and #2B.

Further, three VRPR networks are shown in the figure. A first VRPR network thereof is a bi-directional VRPR network #A comprising a gateway node #1A, gateway node #1B, and relay nodes #1C to #1F in that order. In this VRPR network #A, a duplex ring configuration is employed. Even when a failure occurs in one communication route between an inside communication route #1Li and an outside communication route #1Lo, communication can be continued by retransmitting the packet data by the other communication route.

A second VRPR network is a bi-directional VRPR network #B comprising a gateway node #2A, gateway node #2B, and relay nodes #2C to #2F in that order. In this VRPR network #B, a duplex ring configuration is employed. Even when a failure occurs in one communication route of an inside communication route #2Li and an outside communication route #2Lo, communication can be continued by retransmitting the packet data by the other communication route.

A third VRPR network is a bi-directional VRPR network #C comprising a gateway node #1B, relay nodes #1C to #1F, a gateway node #1A, gateway node #2A, relay nodes #2F to #2C, and gateway node #2B in that order. In this VRPR network #C, a duplex ring configuration is employed via the inter-ring connection network (above redundancy network) #3 and inter-ring connection network (above redundancy network) #4. Due to the inside communication route and outside communication route, even when a failure occurs in one communication route, communications can be continued by retransmitting the packet data by the other communication route.

Figure 2:
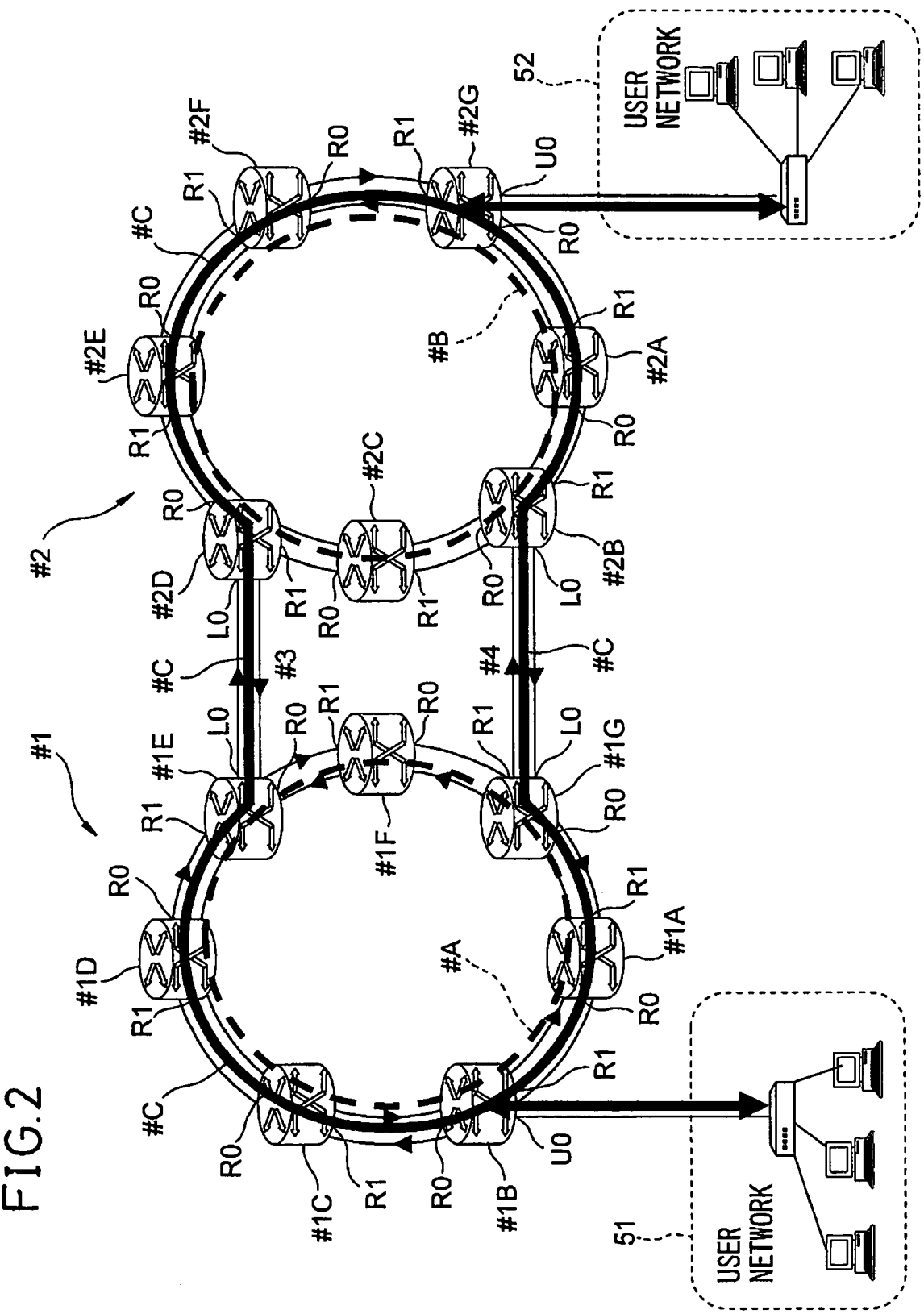
FIG. 2 is a diagram showing an example of the configuration of a concrete network system based on Embodiment 1 of FIG. 1.

FIG. 2 is a diagram showing an example of the configuration of a concrete network system based on Embodiment 1 of FIG. 1. In the figure as well, a VRPR network #A, VRPR network #B, and VRPR network #C are shown.

The VRPR network #A is a network formed by nodes #1A to #1D, a gateway node #1E, node #1F, and gateway node #1G connected in a ring. In this VRPR network #A, packets are transmitted or received at each node. Further, it relays a transmission packet between an interface #R0 (or #R1) for one adjacent node and an interface #R1 (or #R0) for the other adjacent node.

The VRPR network #B is a network formed by a relay node #2A, gateway node #2B, relay node #2C, gateway node #2D, and nodes #2E to #2G connected in a ring. In this VRPR network #B, packets are transmitted or received at each node. Further, it relays a transmission packet between an interface #R0 (or #R1) for one adjacent node and an interface #R1 (or #R0) for the other adjacent node.

The VRPR network #C is a network formed by nodes #1A to 1D, gateway nodes #1E to #2D, nodes #2E to #2A, and gateway nodes #2B to #1G connected in ring. In this VRPR network #C, at each of the gateway nodes #1E and #2B, packets are relayed between the interface #R1 for one adjacent nodes (node #1D, node #2A) and an interface #L0 for the other adjacent nodes (node #2D, node #1G), while at each of the gateway nodes #1G and #2D, packets are relayed between the interface #R0 for one adjacent nodes (node #1A, node #2E) and the interface #L0 for the other adjacent nodes (node #2B, node #1E). At nodes other than these, packets are transmitted or received. Further, transmission packets are relayed between the interface #R0 (or #R1) for one adjacent node, and the interface #R1 (or #R0) for the other adjacent node.

Further, FIG. 2 shows a state where the user network 51 and user network 52 are connected through the VRPR network #C, where the former (51) is connected via a user interface #U0 of the node #1B and the latter (52) is connected via a user network #U0 of the node #2G. Here, the node #1B and node #2G operate as relay nodes and, at the same time, operate as interface nodes.

If explaining the characteristic features according to the configuration represented in FIG. 2, provision is made of gateway nodes (#1E, #1G, #2B, #2D) arranged at connection points with redundancy networks (#3, #4) as at least one type of a plurality of nodes configuring the ring networks; provision is made of interface nodes (#1B, #2G) arranged at connection points with user networks (51, 52) on the user side as at least one type of a plurality of nodes configuring the ring networks; or provision is made of relay nodes relaying packets transferred through these ring networks as at least one type of a plurality of nodes configuring the ring networks. The relay nodes are #1A, #1C, #1D, and #1F in the VRPR network #A of FIG. 2 and #2A, #2C, #2E, and #2F in the VRPR network #B of the figure.

Above, a packet network system according to the embodiments as a whole was explained. Therefore, next, concrete examples of the configurations of the nodes in the system will be explained with reference to FIG. 3 and FIG. 5.

Figure 3:
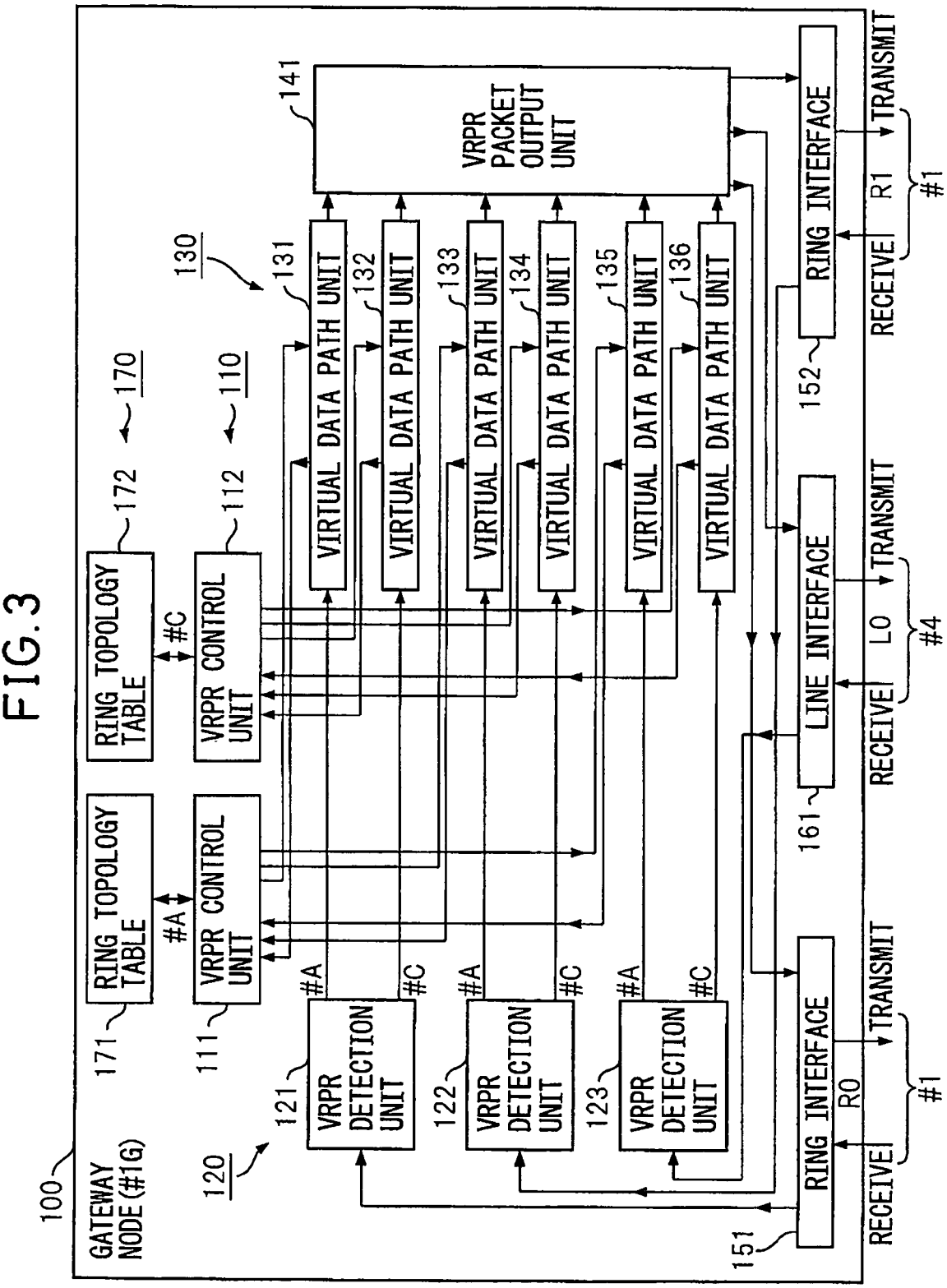
FIG. 3 is a diagram showing a concrete example of the configuration of a gateway.
Figure 5:
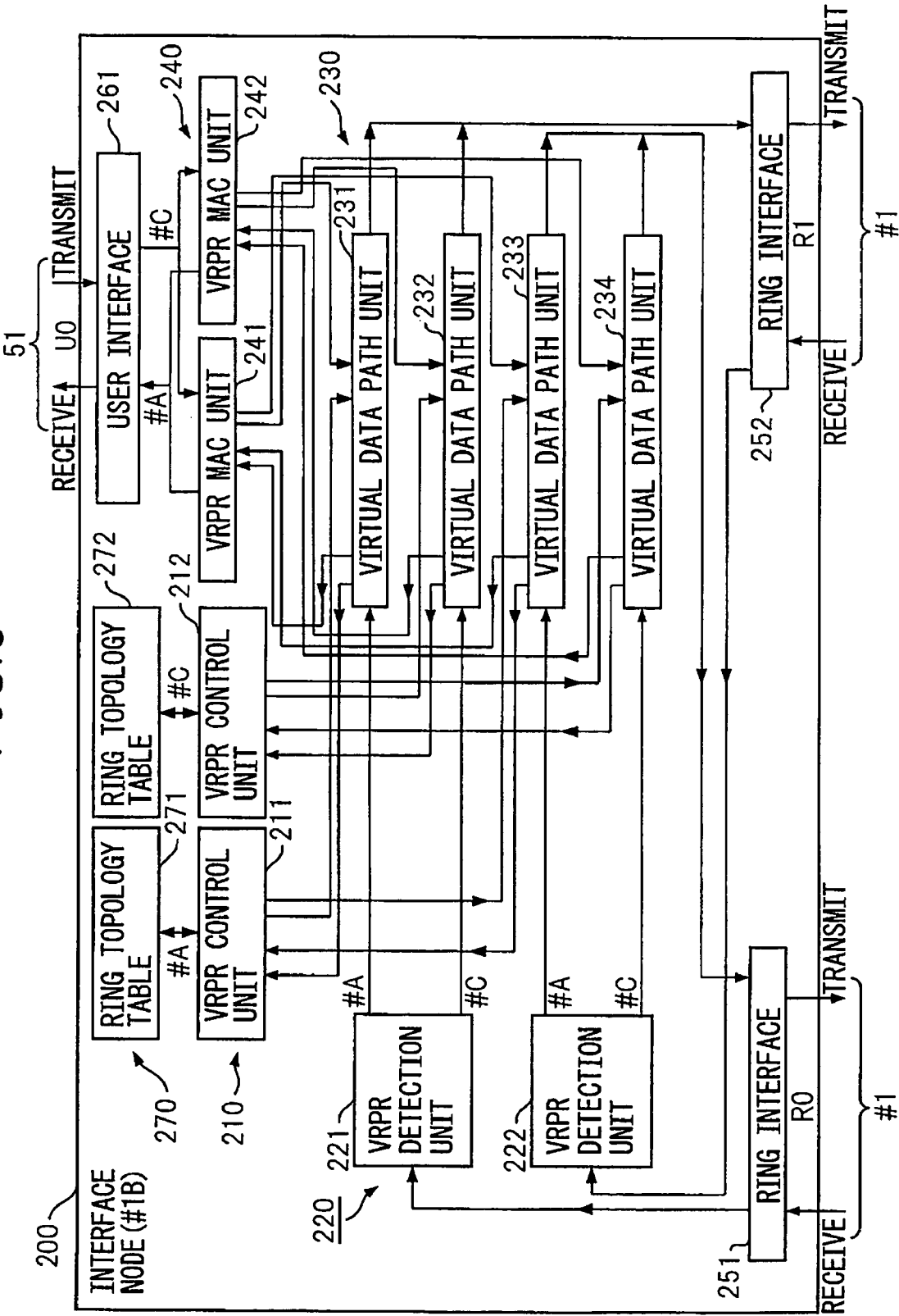
FIG. 5 is a diagram showing a concrete example of the configuration of an interface node.

FIG. 3 is a diagram showing a concrete example of the configuration of a gateway node, while FIG. 5 is a diagram showing a concrete example of the configuration of an interface node. First, the characteristic portions of the embodiment represented in FIG. 3 may be summarized as follows. First, the gateway node (for example #1G) of FIG. 3 is a node configuring part of a packet network system where a virtual resilient packet ring network identifier VRPR ID is included in the header of a packet and that packet is transferred on a virtual resilient packet ring (VRPR) network corresponding to the VRPR ID.

In further detail, this is a gateway node configuring part of a ring network in a packet network system wherein a plurality of virtual resilient packet ring (VRPR) networks (#A, #B, #C) are virtually defined among all of the networks comprised of a plurality of ring networks (#1, #2) which are independently constructed and redundancy networks (#3, #4) linking these ring networks and wherein packets are transferred through a designated VRPR network. This gateway node (for example #1G of FIG. 2) is provided with an identifier detection function unit 120 for detecting a virtual resilient packet ring network identifier VRPR ID included in a packet transmitted/received in the ring network (#1) and a virtual resilient packet ring network identifier VRPR ID of a packet transmitted/received with the redundancy network (#4), and with virtual ring network control function unit (110, 130, 170) for monitoring a packet for each VRPR ID detected by that identifier detection function unit 120 and controlling switching of the virtual resilient packet rings.

Here, the above virtual ring network control function unit (110, 130, 170) have ring topology tables (171, 172) defining topologies of VRPR networks for each VRPR network.

Further, the virtual ring network control function unit (110, 130, 170) have, for each VRPR network, a virtual data path unit (130) for transmitting/receiving control packets with corresponding ring topology table (171, 172) and passing relay packets therethrough.

Furthermore, provision is made of a packet output unit 141 for transmitting the control packets and relay packets from the virtual data path unit (130) to a predetermined ring network (#1, #2) or redundancy network (#3, #4) according to the content of the ring topology tables (171, 172).

Explaining the above characteristic portions in further detail, first, in the gateway node 100 of FIG. 3 (gateway node #1G in the example of FIG. 3), applied to each of the gateway node #1E, gateway node #1G, gateway node #2B, and gateway node #2D shown in FIG. 2, the VRPR control unit 111 and VRPR control unit 112 monitor RPR frames for each VRPR network and control ring switching at the time of the detection of a failure.

The ring topology table 171 and ring topology table 172 are tables for defining the topology of the RPR network for each VRPR network.

The ring interface 151 and ring interface 152 accommodate communication routes of the ring network #1. A line interface 161 accommodates the communication route (#4) for the inter-ring connection. A packet received by each interface is transferred to the VRPR detection unit provided corresponding to each interface. Namely, a packet received at the ring interface 151 is transferred to the VRPR detection unit 121, a packet received at the ring interface 152 is transferred to the VRPR detection unit 122, and a packet received at the line interface 161 is transferred to the VRPR detection unit 123.

The VRPR detection units 121 to 123 judge to which VRPR network (#A/#C) a received packet belongs according to the identifier VRPR ID included in the RPR header of the received packet.

Then, the received packet is transferred to the virtual data path unit individually provided for corresponding VRPR network in accordance with results of the above-described judgment.

For example, a packet judged as belonging to the VRPR network #A in the VRPR detection unit 121 is transferred to the corresponding virtual data path unit 131, and a packet judged as belonging to the VRPR network #C in the VRPR detection unit 121 is transferred to the corresponding virtual data path unit 132.

The virtual data path units 131 to 136 perform extraction/insertion of RPR control packets and relay of packets for each VRPR network. The VRPR packet output unit 141 receiving as input the packets, after these relays, determines to which of the ring interfaces 151 and 152 and line interface 161 the packets, from the virtual data path units 131 to 136, should be output.

Further, the operation of this gateway node #1G will be explained. Ring interfaces #R0 and #R1 of the gateway node #1G shown in FIG. 2 correspond to ring interfaces 151 and 152 in FIG. 3. In the same way, the line interface #L0 of the gateway node #1G shown in FIG. 2 is shown as the line interface 161 in FIG. 3. The gateway node #1G in FIG. 3 accommodates the two VRPR networks #A and #C shown in FIG. 2.

In the gateway node #1G, the VRPR network #A is configured by a ring interface R0 and a ring interface R1.

That is, the gateway node #1G performs transmission/reception of packets with one adjacent node #1A configuring the VRPR network #A via the ring interface R0 and performs transmission/reception of packets with the other adjacent node #1F configuring the VRPR network #A via the ring interface R1.

Packets transferred though the VRPR network #A are processed by the virtual data path unit 131 and virtual data path unit 133 and the VRPR control unit 111. A packet including an identifier of the VRPR network #A received from the ring interface 151, connected to the adjacent node #1A configuring the VRPR network #A, is allocated to the virtual data path unit 131 provided for corresponding VRPR network #A by the detection of the VRPR ID at the VRPR detection unit 121, while a control packet including an identifier of the VRPR network #A is sent to the VRPR control unit 111. The control packet output from this virtual data path unit 131 and a usual relay packet are determined in their destinations by the VRPR packet output unit 141 and transferred to the ring interface 152 which is connected to the adjacent node #1F configuring the VRPR network #A. Further, a packet which is received from this ring interface 152, travels in an inverse direction to that described above, and the packet including the identifier of the VRPR network #A is allocated to the virtual data path unit 133 for corresponding VRPR network #A by the detection of the VRPR ID at the VRPR detection unit 122. Further, the control packet including the identifier of the VRPR network #A is sent to the VRPR control unit 111. The control packet output from this virtual data path unit 133 and the usual relay packet are determined in their destinations by the VRPR packet output unit 141 and transferred to the ring interface 151 which is connected to the adjacent node #LA configuring the VRPR network #A.

Another VRPR network #C coexisting with the above-described VRPR network #A is configured by the ring interface 151 (R0) and line interface 161 (L0) in this gateway node #1G.

That is, the gateway node #1G performs transmission/reception of packets with one adjacent node #1A configuring the VRPR network #C via the ring interface R0 and performs transmission/reception of packets with the other adjacent node #2B configuring the VRPR network #C via the line interface L0.

Packets transferred through the VRPR network #C are processed by the virtual data path unit 132 and virtual data path unit 136 and the VRPR control unit 112. A packet including an identifier of the VRPR network #C, received from the ring interface 151 connected to the adjacent node #1A configuring the VRPR network #C, is allocated to the virtual data path unit 132 for corresponding VRPR network #C by the detection of the VRPR ID at the VRPR detection unit 121, while a control packet including an identifier of the VRPR network #C is sent to the VRPR control unit 112. The control packet output from this virtual data path unit 132 and the usual relay packet are determined in their destinations by the VRPR packet output unit 141 and transferred to the line interface 161 which is connected to the adjacent node #2B configuring the VRPR network #C.

On the other hand, a packet which is received from the line interface 161 connected to the adjacent node #2B configuring this VRPR network #C, travels in the inverse direction to that described above, and the packet including an identifier of the VRPR network #C is allocated to the virtual data path unit 136 for corresponding VRPR network #C by the detection of the VRPR ID at the VRPR detection unit 123, while a control packet including an identifier of the VRPR network #C is sent to the VRPR control unit 112. The control packet output from this virtual data path unit 136 and the usual relay packet are determined in their destinations by the VRPR packet output unit 141 and transferred to the ring interface 151 connected to the adjacent node #1A configuring the VRPR network #C.

Paying further attention to the VRPR control portion 110 and virtual data path portion 130 in FIG. 3 mentioned above, these functional portions 110 and 130 can be easily realized when RPR function blocks (FIG. 4) already known in IEEE draft P802. 17/D3.3 is diverted.

Figure 4:
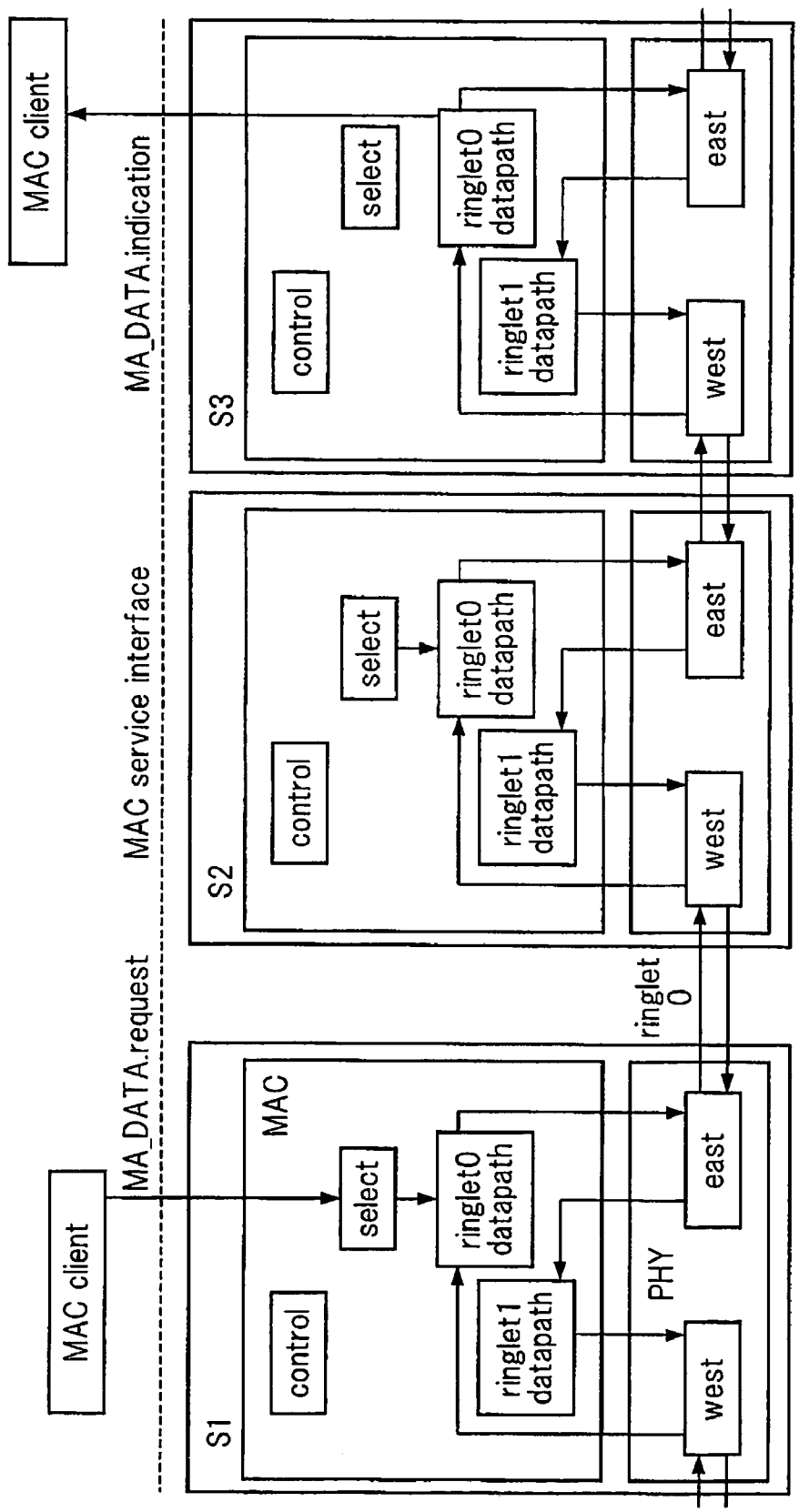
FIG. 4 is a diagram showing a known RPR function block in IEEE.

FIG. 4 is a diagram showing RPR function blocks already known in the IEEE. In the figure, "MAC client" corresponds to the user networks 51 and 52 in the present embodiment, "Control" enables realization of the VRPR control unit (110) of the present embodiment, and "Ringlet0(1)data path" enables realization of the virtual data path unit (130) of the present embodiment. Note that "MA_DATA. request" is data to the RPR direction from a client, "MA_DATA. indication" is data to the client direction from RPR, and "Select" performs the selection of ringlet0 or ringlet1. "ringlet0" corresponds to the already mentioned routes 11*o* and 21*o*, and "ringlet1" corresponds to the already mentioned routes 11*i* and 21*i*.

Referring to FIG. 5 next, an interface node (#1B, #2G) shown in FIG. 2 is concretely shown in the figure. First, the characteristic units of the embodiment expressed in FIG. 5 may be summarized as follows:

This interface node is an interface node configuring the above-described ring network in a packet network system where a plurality of virtual resilient packet ring (VRPR) networks (#A, #B, #C) are virtually defined among all networks comprised of a plurality of ring networks (#1, #2) which are independently constructed and redundancy networks (#3, #4) linking these ring networks, and packets are transferred in the designated VRPR network. This is linked with the user networks (51, 52 etc.) as well. This interface node (for example #1B of FIG. 2) is provided with an identifier detection function unit 220 for detecting a virtual resilient packet ring network identifier VRPR ID included in a packet transmitted/received in the ring network (#1);

virtual ring network control function unit (210, 230, 270) for monitoring packets for each VRPR-ID detected by that identifier detection function unit 220 and controlling switching of the virtual resilient packet rings; and a packet processing unit 240 for applying a transform/inverse transform to a packet format for each VRPR ID with the user network 51.

Here, the above-described virtual ring network control function unit (210, 230, 270) have ring topology tables (271, 272) for defining the topology of the VRPR network for each VRPR network.

Further, the virtual ring network control function unit (210, 230, 270) have, for each VRPR network, a virtual data path unit (231) for transmitting/receiving control packets with corresponding ring topology tables (271, 272) and, at the same time, passing relay packets therethrough.

If explaining above characteristic units in further detail, first, this interface node is applied to both of the interface node #1B and interface node #2G shown in FIG. 2.

In this interface node 200 (#1B in the example of FIG. 2), the VRPR control unit 211 and VRPR control unit 212 monitor RPR frames for each VRPR network and control ring switching at the time of the detection of a failure.

The ring topology table 271 and ring topology table 272 are tables for defining the topology of the RPR network for each VRPR network.

The ring interface 251 and ring interface 252 accommodate communication routes of the ring network #1. On the other hand, the user interface 261 accommodates the communication route for connection with the user network.

A packet received by each ring interface is transferred to the VRPR detection unit provided for each ring interface. Namely, a packet received at the ring interface 251 is transferred to the VRPR detection unit 221, and a packet received at the ring interface 252 is transferred to the VRPR detection unit 222. Then, the VRPR detection unit 221 and VRPR detection unit 222 judge to which VRPR network (#A/#C) those received packets belong according to the VRPR ID included in RPR headers of the received packets. After this judgment is carried out, the VRPR virtual data path units 231 to 234 perform extraction/insertion of RPR control packets and relay of packets for each VRPR network.

At this time, the packet processing portion 240 configured by the VRPR MAC (Media Access Control) unit 241 and VRPR MAC unit 242 provided for each VRPR network applies a transform/inverse transform to the user MAC frame-RPR format, determines a transmission direction of the RPR packet to the ring network according to a destination MAC address, and transfers the VRPR packet to any of the virtual data path units 231 to 234.

Each virtual data path unit, for example the virtual data path unit 231 belonging to the VRPR network #A, constantly monitors whether or not the received packet is directed to its own node (#1B). If this is directed to its own node, between the control packet and data packet composing that received packet, the former control packet is transferred by the virtual data path unit to the VRPR control unit 211, the latter data packet is transferred to the VRPR MAC unit 242, and, here, decapsulates that data packet and drops it to the destination user network 51.

On the other hand, when it is judged that the received packet is not directed to its own node (#1B) by the monitoring at the virtual data path unit 231, the related packet goes through this virtual data path unit 231 and is transferred to the ring interface 252. Note that a control packet directed to its own node (#1B) is sent to the VRPR control unit 211 and rewritten in data etc. at the ring topology table 271.

Further, the operation of this interface node #1B will be explained. The ring interfaces #R0 and #R1 of the interface node #1B shown in FIG. 2 correspond to the ring interfaces 251 and 252 in FIG. 5. In the same way, a user interface #U0 of the interface node #1B shown in FIG. 2 corresponds to a user interface 261 in FIG. 5. Accordingly, the interface node #1B in FIG. 5 accommodates two VRPR networks #A and #C.

In the interface node #1B, the VRPR network #A is configured by the ring interface R0 and ring interface R1.

That is, the interface node #1B performs transmission/reception of packets with one adjacent node 1C configuring the VRPR network #A via the ring interface R0 and performs transmission/reception of packets with the other adjacent node #1A configuring the VRPR network #A via the ring interface R1.

Packets transferred through the VRPR network #A are processed by the virtual data path unit 231 and virtual data path unit 233 and the VRPR control unit 211. A packet including an identifier of the VRPR network #A, received from the ring interface 251 connected to one adjacent node #1C configuring the VRPR network #A, is allocated to the virtual data path unit 231 provided for the VRPR network #A by the detection of the VRPR ID at the VRPR detection unit 221, while a control packet including an identifier of the VRPR network #A is sent to the VRPR control unit 211. The control packet output from this virtual data path unit 231 and the usual relay packet are transferred to the ring interface 252 which is connected to one adjacent node #1A configuring the VRPR network #A.

On the other hand, a packet including an identifier of the VRPR network #A in the reverse direction, received from the ring interface 252 connected to the other adjacent node #1A configuring the VRPR network #A, is allocated to the virtual data path unit 233 provided for the VRPR network #A by the detection of the VRPR ID at the VRPR detection unit 222. Further, the control packet including the identifier of the VRPR network #A is sent to the VRPR control unit 211. A control packet output from this virtual data path unit 233 and the usual relay packet are transferred to the ring interface 251 which is connected to one adjacent node #1C configuring the VRPR network #A.

Another VRPR network #C co-existing with the VRPR network #A is configured by the ring interface R0 and ring interface R1 in this interface node #1B.

That is, the interface node #1B performs transmission/reception of packets with one adjacent node #1C configuring the VRPR network #C via the ring interface R0 and performs transmission/reception of packets with the other adjacent node #1A configuring the VRPR network #C via the ring interface R1.

Packets transferred through the VRPR network #C are processed by the virtual data path unit 232 and virtual data path unit 234 and the VRPR control unit 212. A packet including an identifier of the VRPR network #C, received from the ring interface 251 connected to one adjacent node #1C configuring the VRPR network #C, is allocated to the virtual data path unit 232 provided for the VRPR network #C by the detection of the VRPR ID at the VRPR detection unit 221, while a control packet including an identifier of the VRPR network #C is sent to the VRPR control unit 212. The control packet output from this virtual data path unit 232 and the usual relay packet are transferred to the ring interface 252 which is connected to one adjacent node #1A configuring the VRPR network #A.

On the other hand, a packet including an identifier of the VRPR network #C in the inverse direction to that described above, received from the ring interface 252 connected to the other adjacent node #1A configuring the VRPR network #C, is allocated to the virtual data path unit 234 provided for the VRPR network #C by the detection of the VRPR ID at the VRPR detection unit 222, while a control packet including an identifier of the VRPR network #C is sent to the VRPR control unit 212. The control packet output from this virtual data path unit 234 and the usual relay packet are transferred to the ring interface 251 which is connected to one adjacent node #1C configuring the VRPR network #C.

In the interface node #1B at this time, the user interface 261 is connected to the VRPR network #C. Packets on the VRPR network #C which are input to the virtual data path unit 232 and virtual data path unit 234 and include destination MAC addresses corresponding to the user interface node #1B are transferred to the VRPR MAC unit 242 and decapsulated there. Further, they are output to the user interface 261 and transmitted to the user network 51. On the other hand, packets received at this user interface 261 are subjected to RPR formatting at the VRPR MAC unit 242, then the VRPR identifier (VRPR ID)=C is given to the packets. C is here given to the VRPR ID, because the VRPR network #C is here designated by the network design when the communications are setup between the user network 51 and user network 52. Thus, the connection between the node #1B and node #2G, relaying transmission/reception packets between user networks 51 and 52, is possible only by the RPR network #C. In this way, packets received from the user network 51 are subjected to RPR formatting and transmitted, via the virtual data path unit 232 and virtual data path unit 234, from the ring interface 251 and ring interface 252 to the ring network #1. Packets transmitted from the interface U0 to the ring network #1 are transmitted from either of the ring interface R0 or R1. The instruction as to which of these R0 and R1 the packets are to be transmitted is given by the VRPR MAC unit 242 belonging to the selected network #C. The instruction for this selection is given from the #C side VRPR control unit 212, via the control line (not shown), to that VRPR MAC unit 242.

The instruction for the selection mentioned above is determined with reference to the ring topology table 272 by the VRPR control unit 212. In this reference, in the ring topology table (FIG. 9), the size of the number of hops up to the node of the other party (#2G) is judged. For example, the ring interface R0 side at which this number of hops becomes small is selected.

Note that, as concrete configurations of the VRPR control portion 210 and virtual data path portion 230 mentioned above, the aforesaid configuration of the RPR function block of FIG. 4 can be applied in the same way.

Note that, comparing with both the above-described gateway nodes and interface nodes, regarding the configuration of the relay nodes (#1A, #1C, #1D, #1F, and #2A, #2C, #2E, #2F of FIG. 2) configuring the ring networks, if referring to FIG. 5 described above, the only difference resides in that, in the relay nodes, the packet processing portion 240 and user interface 261 are invalidated or not mounted. The rest of the units are as shown in this FIG. 5.

Namely, each above relay node is a relay node configuring part of the above-described ring network in a packet network system wherein a plurality of virtual resilient packet ring (VRPR) networks (#A, #B, #C) are virtually defined among all networks comprised of a plurality of ring networks (#1, #2) which are independently constructed and redundancy networks (#3, #4) linking these ring networks and wherein packets are transferred through the designated VRPR network. This relay node (for example #1A of FIG. 2) is provided with an identifier detection function unit 220 for detecting a virtual resilient packet ring network identifier VRPR ID included in a packet transmitted/received in the ring network (#1) and virtual ring network control function unit (220, 230), for each VRPR network, monitoring the packets for each VRPR ID detected by the identifier detection function unit 220 and controlling switching of the virtual resilient packet ring and having a ring topology table 270 for defining the topology of this VRPR network.

As apparent from the above explanation, all of the above-described relay nodes, gateway nodes, and interface nodes may be given first a common modular configuration and then units not required for respective node may be removed or invalidated. That is, a module provided with all of units shown in FIG. 3 and FIG. 5 described above is prepared. Units of the user interface 261 and packet processing portion 240 in FIG. 5 are invalidated in the case of the gateway unit. Further, in a case of the interface node, units of the VRPR packet output unit 141 of FIG. 3 and the user interface 261 and packet processing portion 240 of FIG. 5 may be invalidated.

Alternatively, it is also possible to configure the hardware to enable the addition and deletion of just the functional portions necessary for only the gateway unit described above and just the functional portions necessary for the interface node and design nodes based on the relay nodes and adding the functional portions according to need.

Figure 6:
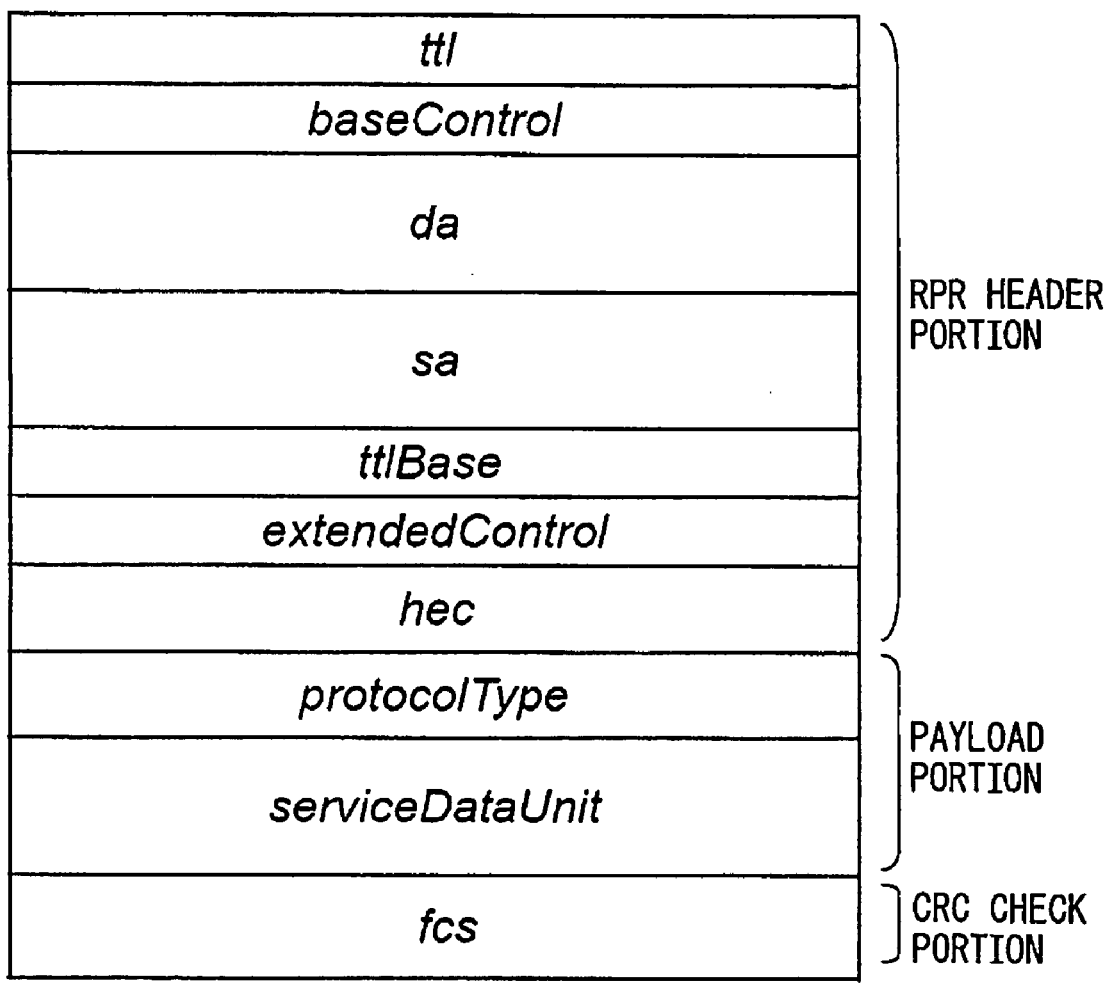
FIG. 6 is a diagram showing a format of an RPR packet.

Next, a detailed example will be given of some of the principal components among the components mentioned above. First, FIG. 6 is a diagram showing the format of an RPR packet. Each virtual resilient packet ring (VRPR) network defined according to the embodiment is identified by a virtual resilient packet ring network identifier (VRPR ID) allocated to each. An example of the method of display of this VRPR ID is shown in FIG. 6.

The format of FIG. 6 is prescribed in IEEE802.17/D3.3. The above VRPR packet is according to the format of the RPR packet shown in the figure. Details thereof are as follows.

ttl: Decremented by 1 each time going through the node. Number of nodes in the ring can be learned by a comparison with ttlBase.

baseControl: Identification of ringlet, validity/invalidity of fairness, frame type, service class, and other information necessary for the control of RPR are stored.

da: Destination MAC address sa: Source MAC address ttlBase: Used for calculation of number of nodes in ring.

extendedControl: Used for flooding or other RPR control.

hec: Used for error check of the header unit.

protocolType: Used for identification of MAC client protocol.

serviceDataUnit: MAC client data.

fcs: Used for error check of frame.

Figure 7:
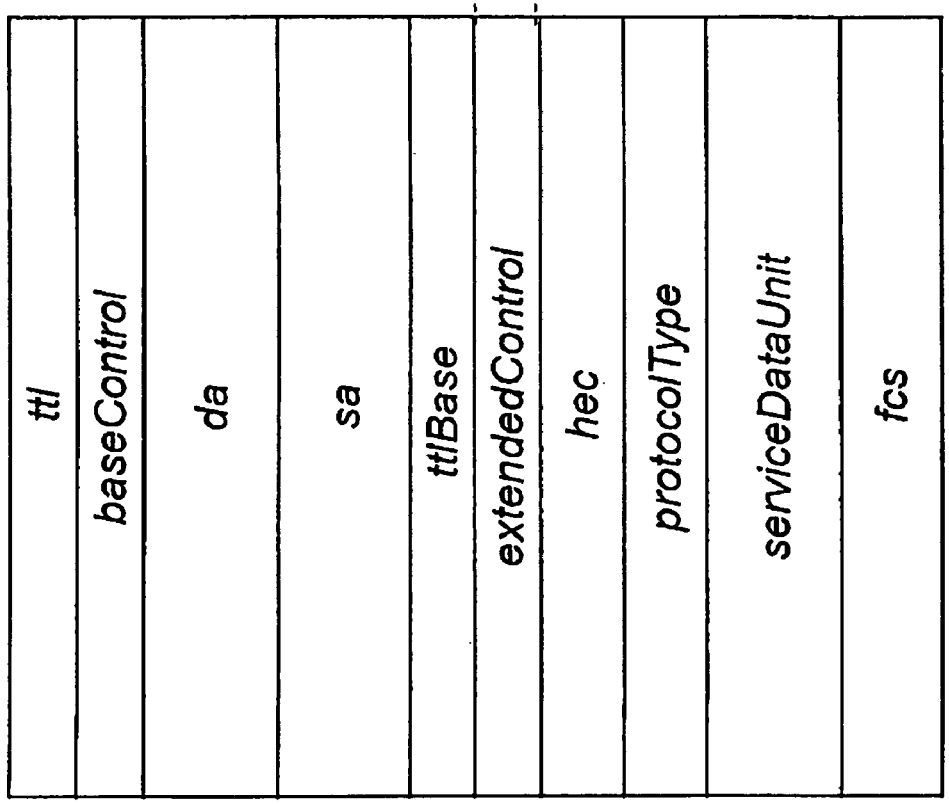
FIG. 7 is a diagram showing a first format of a VRPR identifier (VRPR ID)

FIG. 7 is a diagram showing a first format of a VRPR identifier (VRPR ID). In the figure, the unused bits of the three bits on the LSB side in the extendedControl field prescribed in IEEE802.17/D3.3 are used as the VRPR ID. Nodes in the networks use packets shown in the figure or FIG. 8, prepare ring topology tables (171, 172, 271, 272) for each VRPR network, and execute the control according to IEEE802.17/D3.3 for each VRPR.

Figure 8:
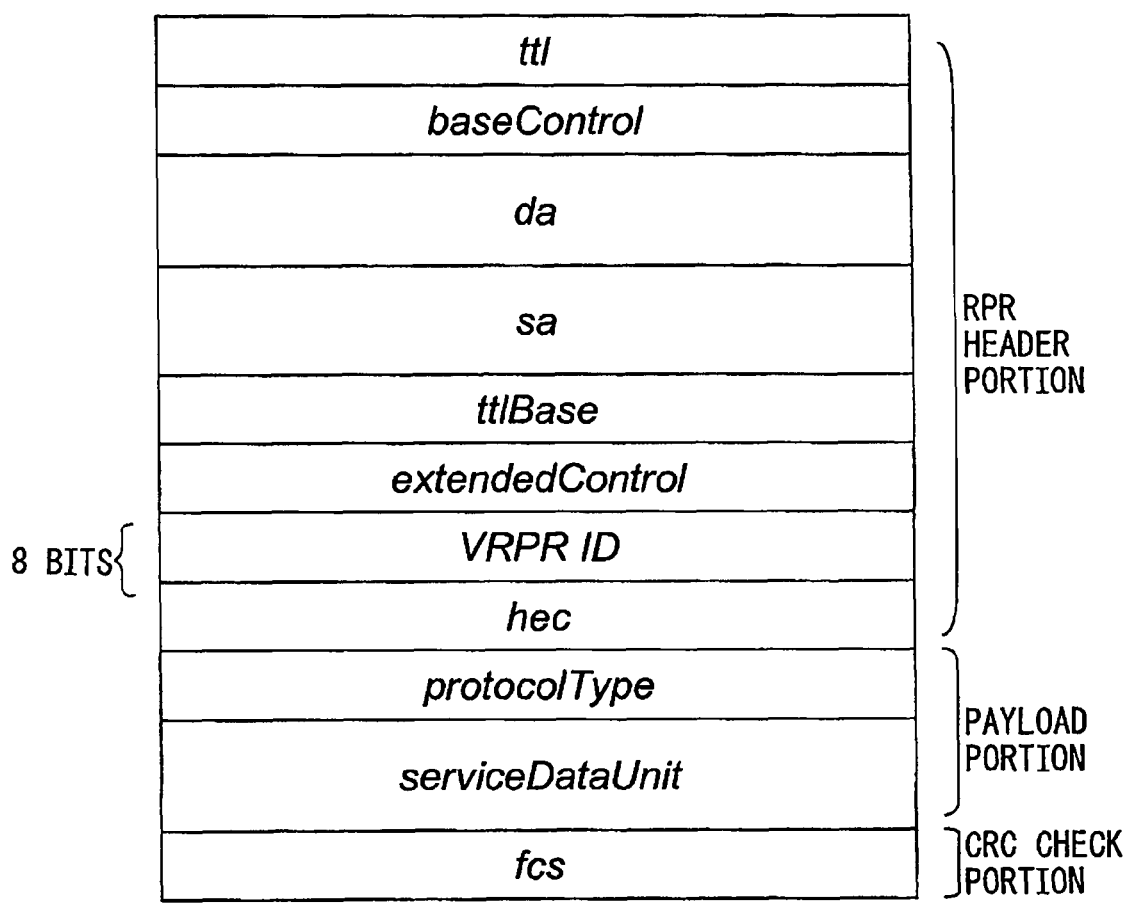
FIG. 8 is a diagram showing a second format of a VRPR identifier (VRPR ID)

FIG. 8 is a diagram showing a second format of a VRPR identifier (VRPR ID). In the format of FIG. 7, VRPR ID is comprised of up to three bits, therefore the number of IDs becomes up to eight. Therefore, a VRPR ID field of 8 bits is given in FIG. 8. Due to this, 256 types of VRPR IDs at the maximum can be obtained.

FIG. 9 is a diagram showing a ring topology table in the interface node #1B as an example.

The ring topology table is provided for each VRPR network to which that node belongs. In FIG. 9, the interface node

1B belongs to VRPR#A and VRPR#C, therefore has ring topology tables for #A and #C.

Each ring topology table holds the number of hops up to the other nodes (#1A, #1G . . . ) in the corresponding VRPR, together with the related address, from its own node #1B. Because of the bi-directional ring, it holds the number of hops for each of the clockwise direction and a counterclockwise direction. Note that the content of the table shown in this FIG. 9 is immediately rewritten when a failure occurs in any of the networks.

Figure 10:
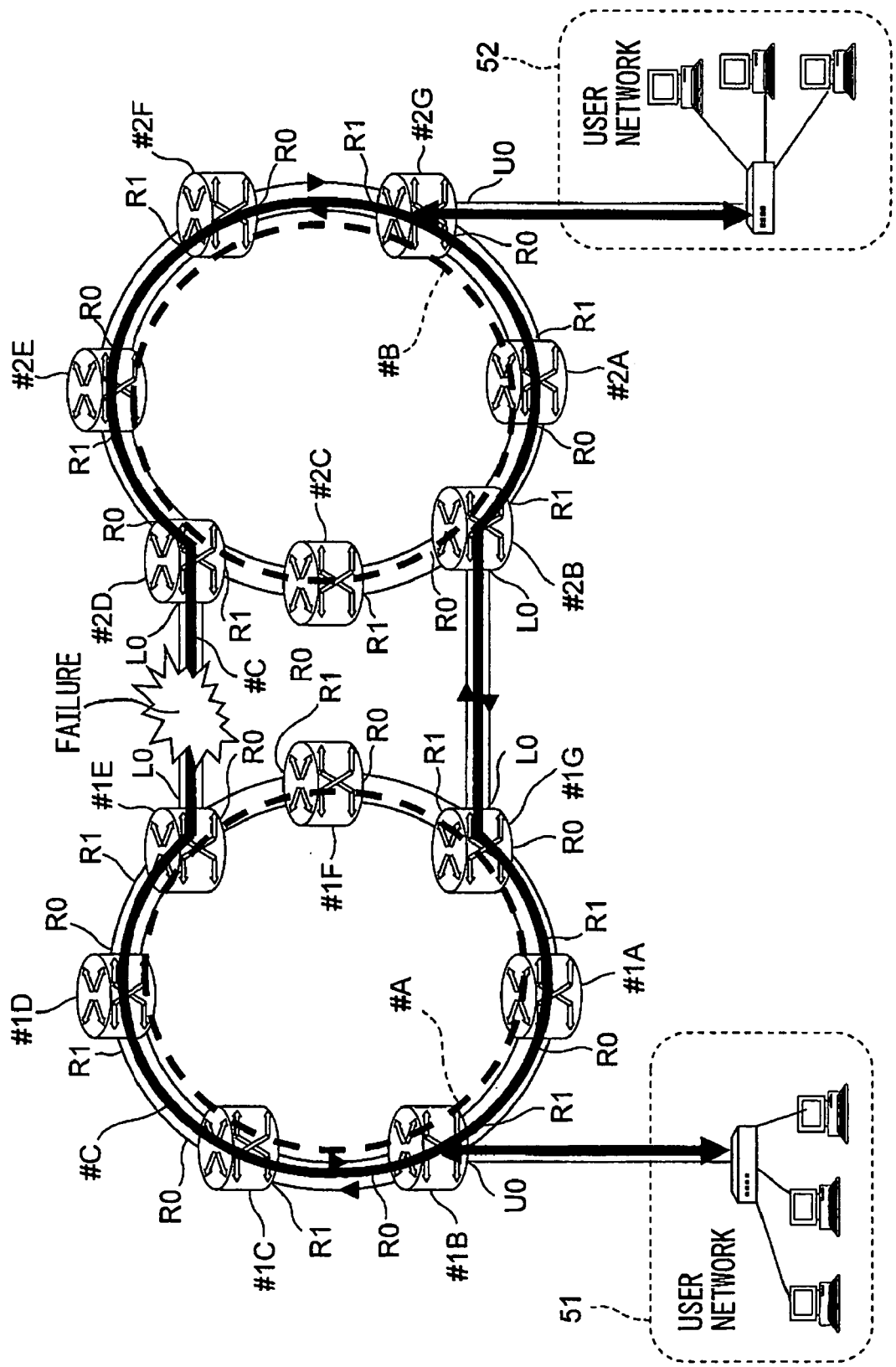
FIG. 10 is a diagram showing when a failure occurs in a portion in the network system of FIG. 2.

FIG. 10 is a diagram showing the occurrence of failure in a unit in the network system of FIG. 2. In the example of the figure, a failure occurs between gateway nodes #1E and #2D. Under this situation, the content of the ring topology table must be rewritten.

For example, FIG. 11 is a diagram showing a situation where the content of the ring topology table of the interface node #1B shown in FIG. 9 is rewritten due to the occurrence of the failure shown in FIG. 10. As shown in the figure, the number of hops and address for each node are erased, which node becomes unable to communicate due to the failure described above.

Specifically, the VRPR#A is not affected by the failure shown in FIG. 10. Therefore, the ring topology table corresponding to VRPR#A of the ring node #1B is not rewritten.

The VRPR#C is affected by the failure shown in FIG. 10, therefore the ring topology table corresponding to the VRPR#C of the ring node #1B belonging to #C is rewritten.

As to the VRPR#C, in the ringlet of the clockwise direction started from the ring node #1B, the nodes up to the nodes #1C, #1D, and #1E, located before the failure unit, are visible, but the nodes of #2F, #2G, #2A, #2B, #1G, and #1A after the node #2D, located after the failure unit, are not visible. Thus the contents relating to the above invisible nodes of the ring topology table are erased.

In the same way, in the ringlet of the counterclockwise direction started from the ring node #1B, the nodes up to the nodes #1A, #1G, #2B, #2A, #2G, #2F, #2E, and #2D, located before the failure unit are visible, but the nodes of #1D and #1C after the node #1E, located after the failure unit, are not visible. Thus, the contents relating to the invisible nodes of the ring topology table are erased.

According to this rewritten ring topology table, the interface node #1B can execute processing for transfer to cope with this failure by transferring packets belonging to VRPR#C in the counterclockwise ringlet direction, which have been transferred in the clockwise ringlet direction so far.

As explained above, according to the above Embodiment 1, in a service (connection between user networks) spanning two ring networks (#1, #2) as well, a network redundancy can be realized for each VRPR network, which network redundancy may be equivalent to the standard RPR.

Embodiment 2

In Embodiment 1 (see FIG. 2), for the service spanning two ring networks, a redundancy equivalent to the standard RPR can be provided for each VRPR network. However, a redundancy more than the redundancy realized in the standard RPR cannot be provided. Even so, in the following Embodiment 2, a technique for realizing a redundancy will be explained, which is more than the redundancy in the standard RPR.

Figure 12:
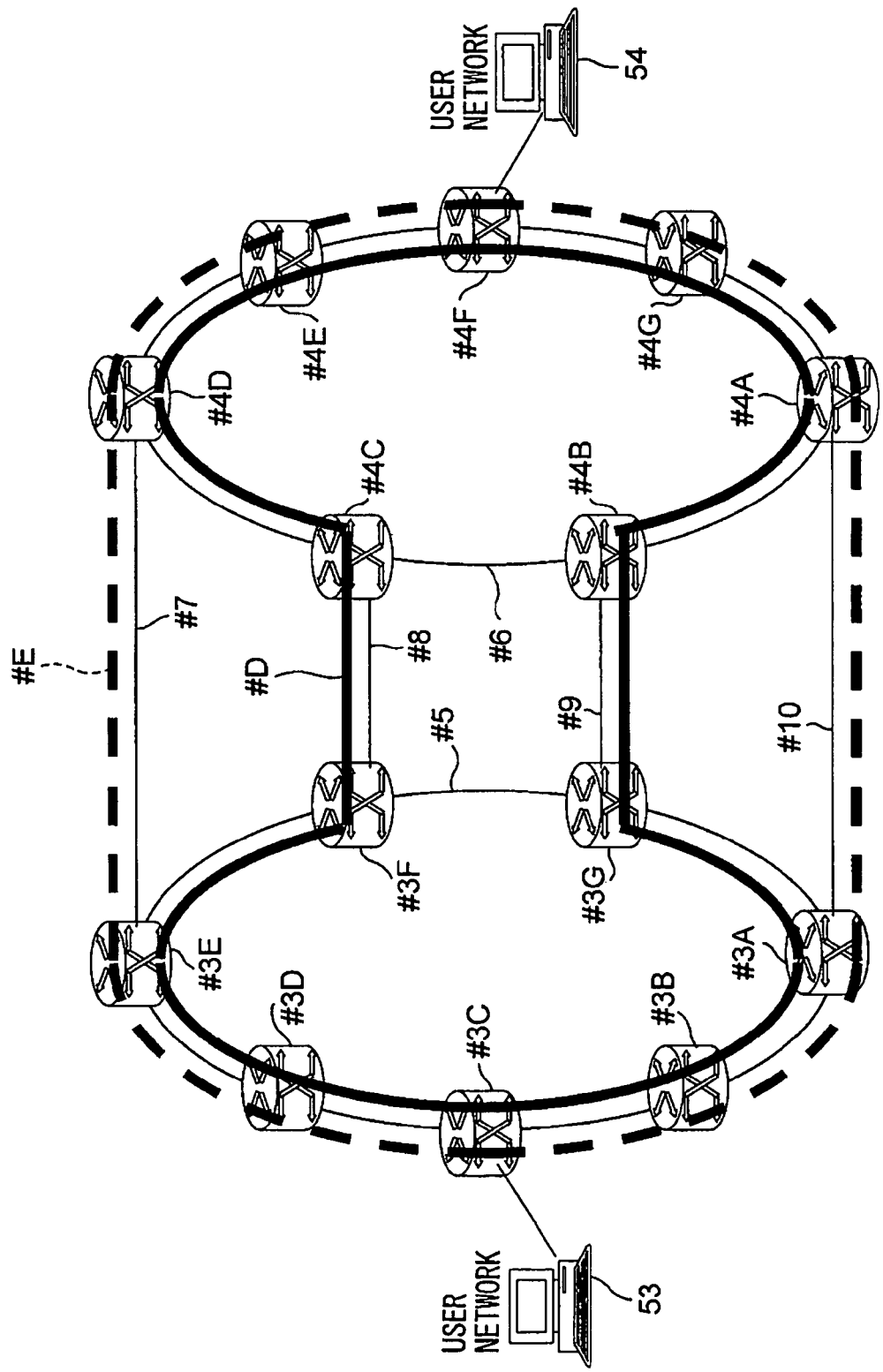
FIG. 12 is a diagram for explaining in brief an Embodiment 2.

FIG. 12 is a diagram for explaining Embodiment 2 according to the present embodiment in brief. The figure shows a certain network wherein inter-ring connection is formed between the ring network #5 and the ring network #6 by introducing further gateway nodes so as to obtain the node redundancy by a plurality of redundant interfaces #7 to #10.

The figure shows two VRPR networks. The first VRPR network is a bi-directional VRPR network #D which is configured by a gateway node #3A, relay nodes 3B to 3D, gateway node #3E, gateway node #3F, gateway node #4C, gateway node #4D, relay nodes 4E to 4G, gateway node #4A, gateway node #4B, and gateway node #3G and thus a ringlet in the clockwise direction is formed in this sequence.

On the other hand, the second VRPR network is a bi-directional VRPR network #E which is configured by a gateway node #3A, relay nodes #3B to 3D, gateway node #3E, gateway node #4D, relay nodes 4E to 4G, and gateway node #4A and thus a ringlet in the clockwise direction is formed in this sequence.

Further, the figure shows a state where the user network 53 and user network 54 are connected by a user interface of the interface node #3C and a user interface of the interface node #4F, and these user interfaces select the VRPR network #D as an initial setting (default). Accordingly, by that initial setting (default), the user network 53 and user network 54 perform packet communications via the VRPR network #D.

Further, in this FIG. 12, assuming that failures occur in both of the redundant interface #8 and redundant interface #9, communication between the user network 53 and user network 54 via the above-described VRPR network #D is disconnected. However, by switching the connection between the user interface node #3C and user interface node #4F to the VRPR network #E side, then packet communication can be continued through the VRPR network #E.

Figure 13:
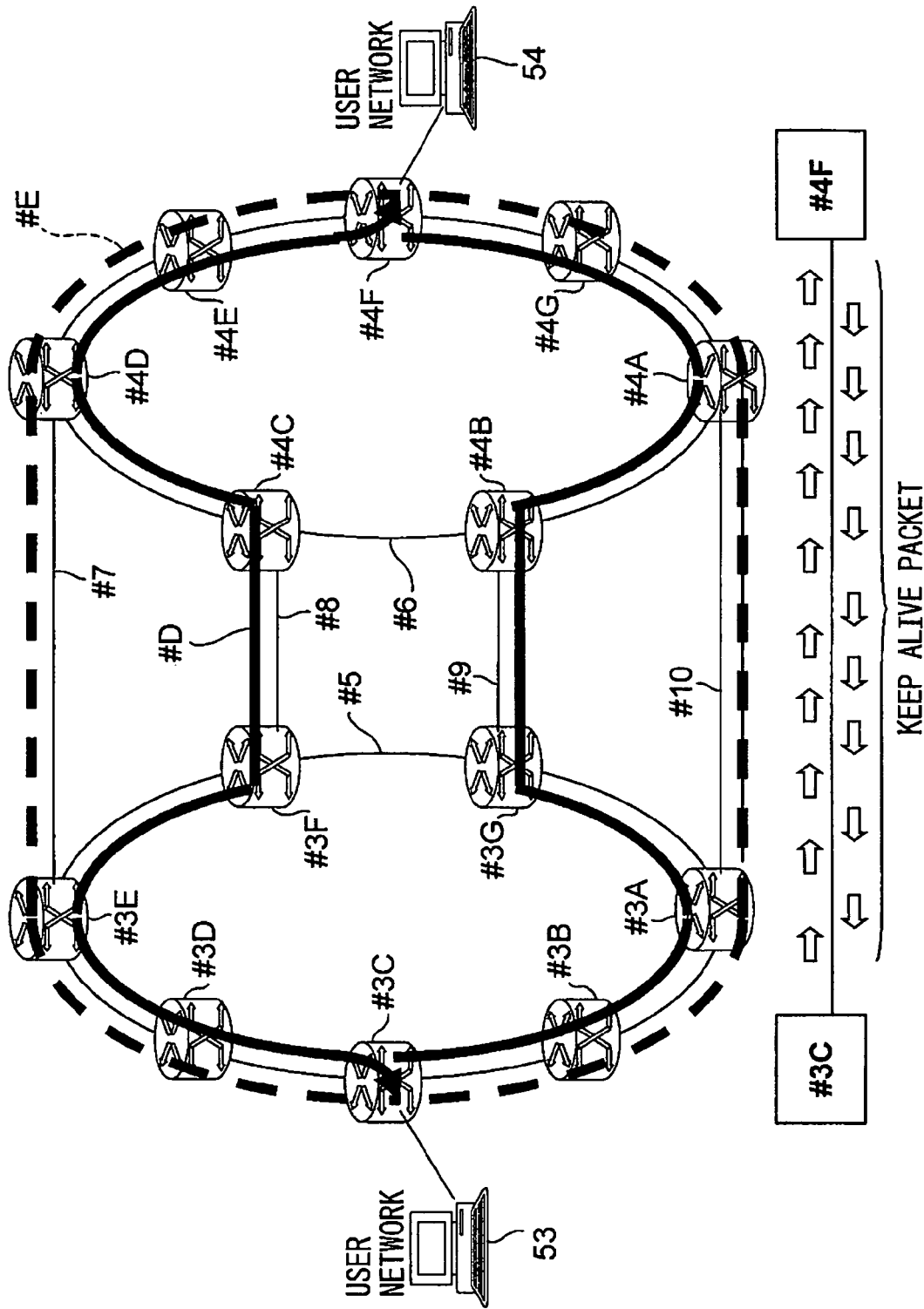
FIG. 13 is a diagram showing a state where a default VRPR network is selected between interface nodes #3C and #4F in FIG. 12.

Below, a switch operation of VRPR networks in this Embodiment 2 will be explained. FIG. 13 is a diagram showing a state where the VRPR network #D of the initial setting (default) is selected between the interface nodes #3C and #4F in FIG. 12. In IEEE802.17/D3.3, two types of schemes, that is, 1) steering scheme and 2) wrapping scheme, are prescribed as the switching schemes of RPR. The steering scheme of 1) is a scheme of achieving switching the packet transmission direction at the source, while the wrapping scheme of 2) is a scheme of achieving loopback of packets at a failure detected node as in BLSR of SONET/SDH. FIG. 13 shows a case of the steering scheme of 1).

Further, FIG. 13 shows a state where, between the interface node #3C and interface node #4F, connection confirmation between these nodes is carried out by a "keep alive" packet. This keep alive packet transmission can be performed by the use of a BFD (bi-directional forwarding detection) or other general technique. In this case, the keep alive packet is transmitted/received between the nodes #3C and #4F via the VRPR network now selected (#D in this example). Alternately, the keep alive packet may be transmitted/received by using both of this network #D and network #E of the other side as well.

FIG. 13 shows a state where, as the path between the user network 53 and user network 54, the VRPR network #D is selected by default, and the keep alive packet is normally transmitted/received.

FIG. 13 shows the normal transmission/reception of the keep alive packet between the nodes #3C and #4F via paths in an upper half of the VRPR network #D shown in FIG. 12 described above by the bold double-headed arrow. In this case, when the paths in the lower half of #D have a smaller number of hops, the paths in the lower half may be selected as well, or the transmission/reception may be carried out via both of the paths in the upper half and the paths in the lower half as well. The reliability rises in the latter.

Figure 14:
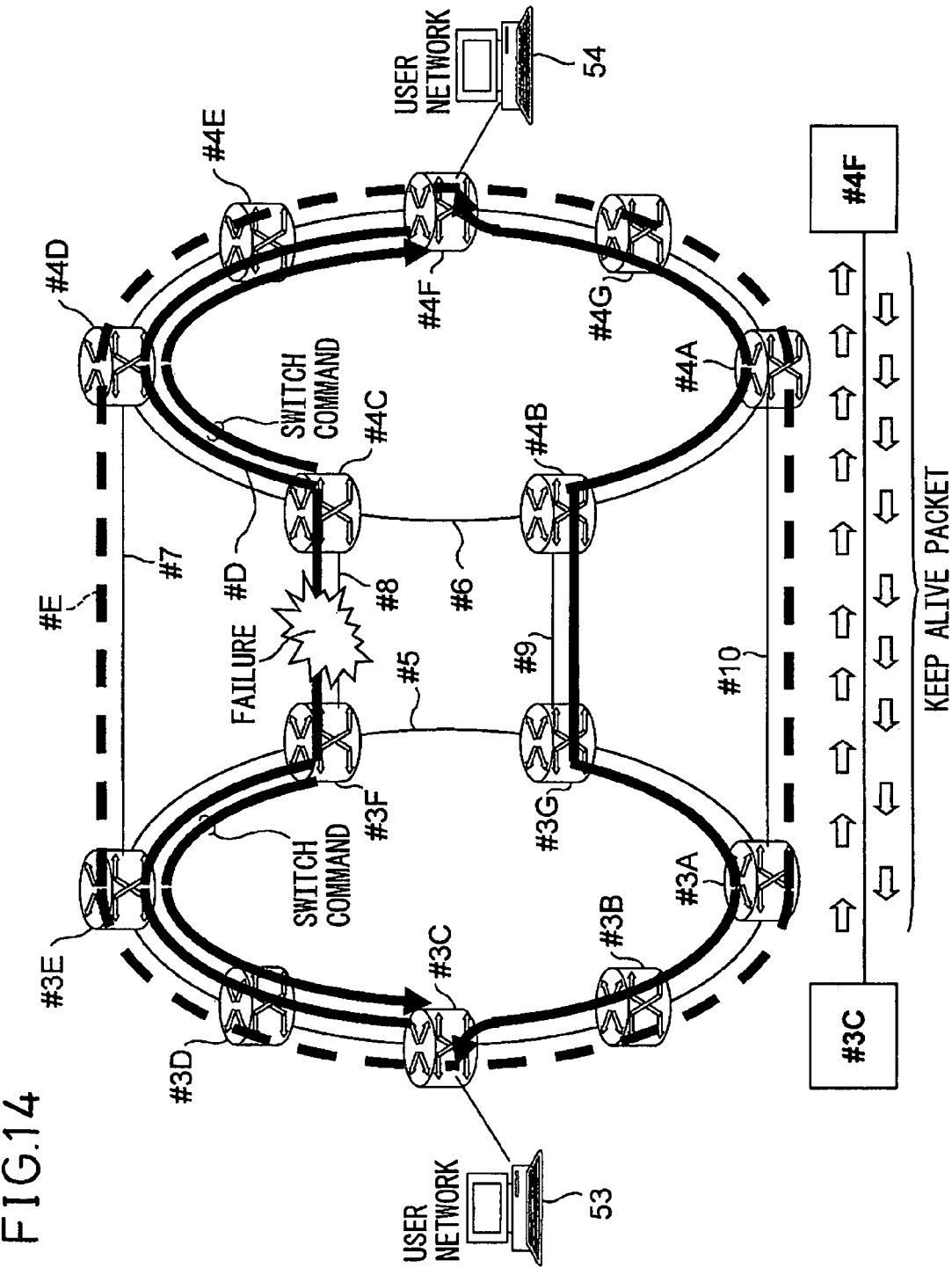
FIG. 14 is a diagram showing a state where a failure occurs at a line interface #8.

FIG. 14 is a diagram showing a state where a failure occurs in the redundant interface #8. The gateway node #3F and gateway node #4C detecting this failure transmit RPR packets of a switch command including VRPR-ID=D to the VRPR network #D. The user interface node #3C and user interface node #4F receiving the RPR packets of the switch command execute switchings of RPRs for the VRPR network #D. Note that, by these switchings of RPRs, the keep alive packet can be normally transmitted/received as well. In the figure, the bold arrow along the nodes #3F→#3E→#3D shows the transfer of the switch command from the node #3F to #3C, while the bold arrow along the nodes #4C→#4D→#4E shows the transfer of the switch command from the node #4C to #4F. The bold double-head arrow in the lower half expresses the fact that ring switchings by these switch commands are completed and that the transmission/reception of the keep alive packet between the nodes #3C and #4F is restarted again.

Figure 15:
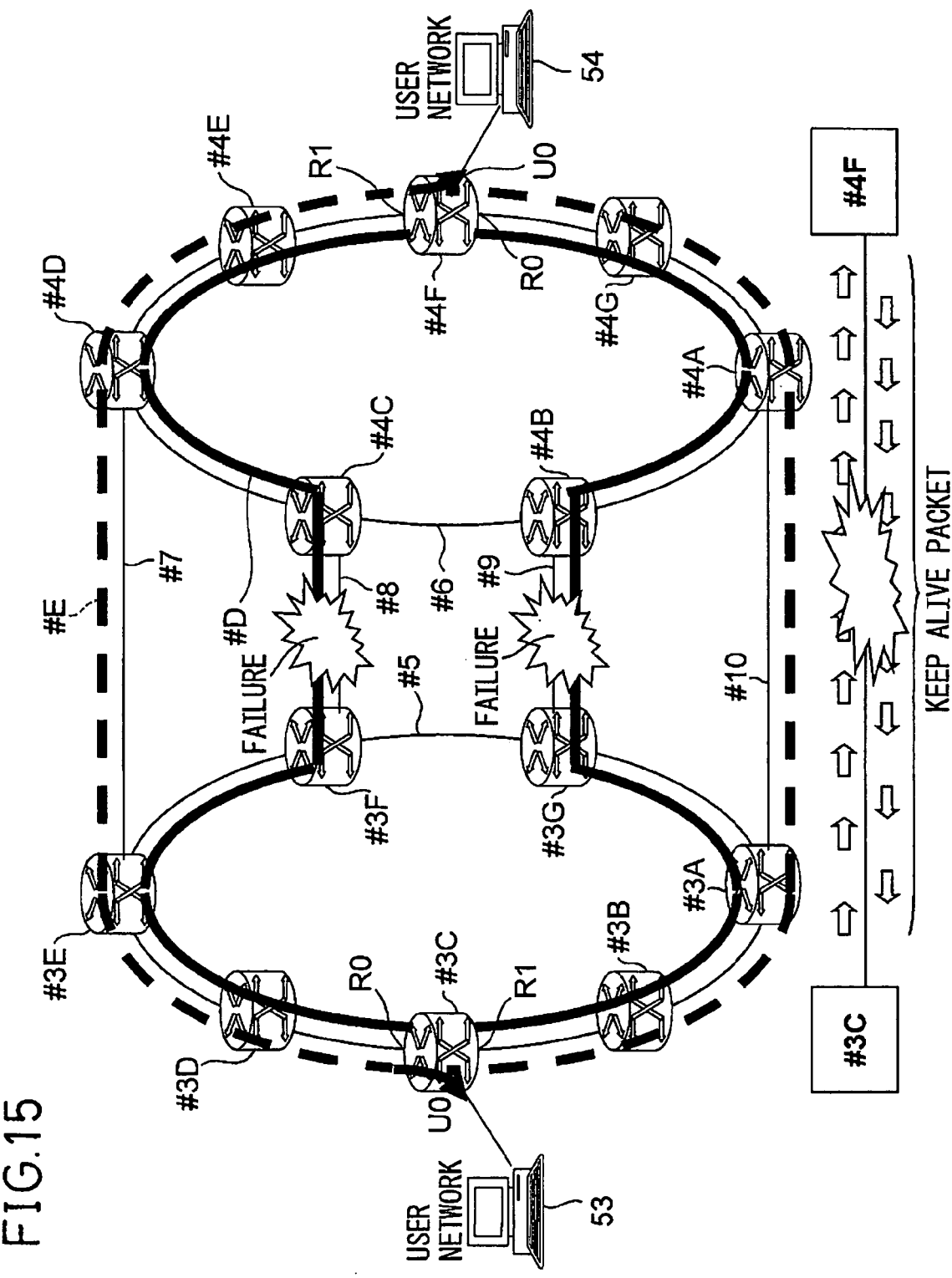
FIG. 15 is a diagram showing a state where a failure occurs at a line interface #9 in addition to the state of FIG. 14.

FIG. 15 is a diagram showing a state where a failure occurs in the line interface #9 as well the state of FIG. 14. In this case, packet communication using the VRPR network #D between the user network 53 and user network 54 becomes impossible. The transmission/reception of a keep alive packet between the interface node #3C and interface node #4F is stopped as well. Due to this, the interface node #3C and interface node #4F sense that a failure occurred in the VRPR network #D and switch the VRPR network (#D) now selected to the VRPR network #E side.

Figure 16:
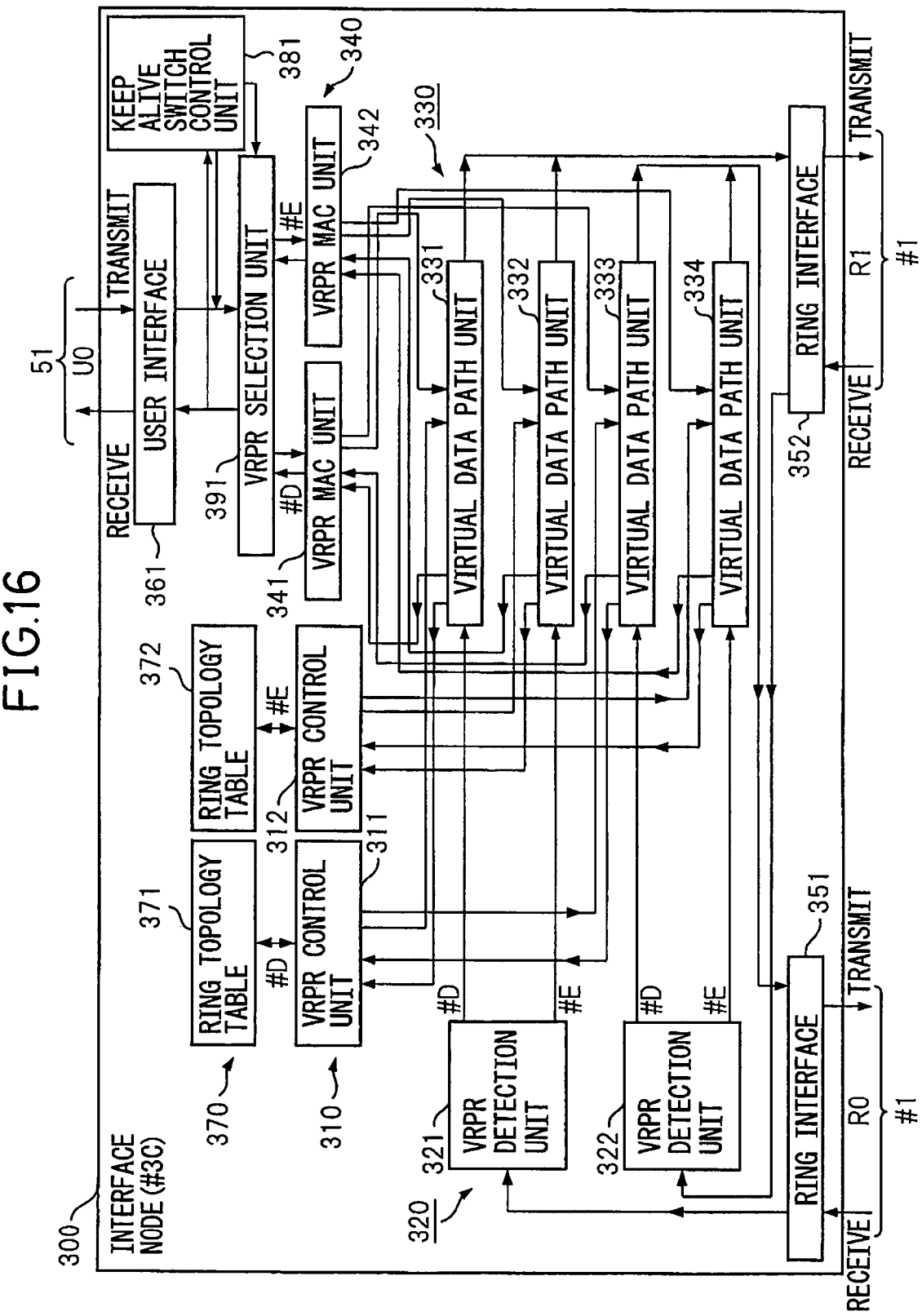
FIG. 16 is a diagram showing an example of the configuration of an interface node in Embodiment 2.

FIG. 16 is a diagram showing an example of the configuration of the interface node in Embodiment 2. This interface node 300 can be used to any of interface nodes #3C and interface nodes #4F shown in FIG. 12 to FIG. 15, but a case of the node #3C is shown in FIG. 16 as an example.

The units to be particularly noted in the figure are a VRPR selection unit 391, for each VRPR network, connected with a virtual data path unit 330 for each virtual resilient packet ring (VRPR) network and a switch control unit 381 indicating the ring selection in accordance with the ring switch command.

The VRPR control portion 310, ring topology table 370, ring interfaces 351 and 352, user interface 361, VRPR detection portion 320, virtual data path portion 330, and VRPR MAC portion 340 in FIG. 16 are the same as the corresponding portions in FIG. 5 mentioned before. The above-described switch control unit 381 is concretely a keep alive switch control unit, generates a keep alive packet to be transmitted, monitors the received keep alive packet, monitors the received keep alive packet, and selects the VRPR network #D or #E based on those monitoring results. The indication of this selection is given to the VRPR selection unit 391. The VRPR selection unit 391 selects the VRPR network based on the above indication from the keep alive switch control unit 381.

FIG. 17 is a diagram showing the format of a BFD packet as an example used as the keep alive packet. This format is prescribed by IETF (http://www.ietf.org/internet-drafts/draft-ietf-bfd-base-05.txt). In order to transmit/receive this BFD packet as a keep alive packet between the keep alive switch control units (381) in the interface nodes #3C and #4F, each keep alive switch control unit (381) is provided with a function of inserting the MAC address and the BFD packet into the MAC frame to be transmitted (inserting the BFD packet into a data region of the frame) and a function of extracting the BFD packet from the received MAC frame.

Explaining the BFD packet of FIG. 17 in further detail, this is as follows:

Version (Vers): Display of version of protocol.
Diagnostic (Diag): Display of the reason for a change of state of the previous session.
State (Sta): Display the state of the BFD session at present.
Poll (P): Notify a connection confirmation or a request of confirmation of parameter change.
Final (F): Display whether or not this is a response of the Poll (P) request.
Control Plane Independent (C): Display used/unused stated of the control plane.
Authentication Present (A): Display presence/absence of authentication.
Demand (D): Display validity/invalidity of demand mode.
Received (R): Unused bit
Detect Mult: Display transmission interval.
Length: Packet length of BFD control packet.
My Discriminator: ID (own station) for discriminating the BFD session.
Your Discriminator: ID (opposite station) for discriminating the BFD session.
Desired Min TX Interval: Display of the transmission interval of BFD control packets.
Required Min RX Interval: Display of permissible reception interval of BFD control packets.
Required Min Echo RX Interval: Display validity/invalidity of a BFD echo packet and permissible reception interval.

Figure 18:
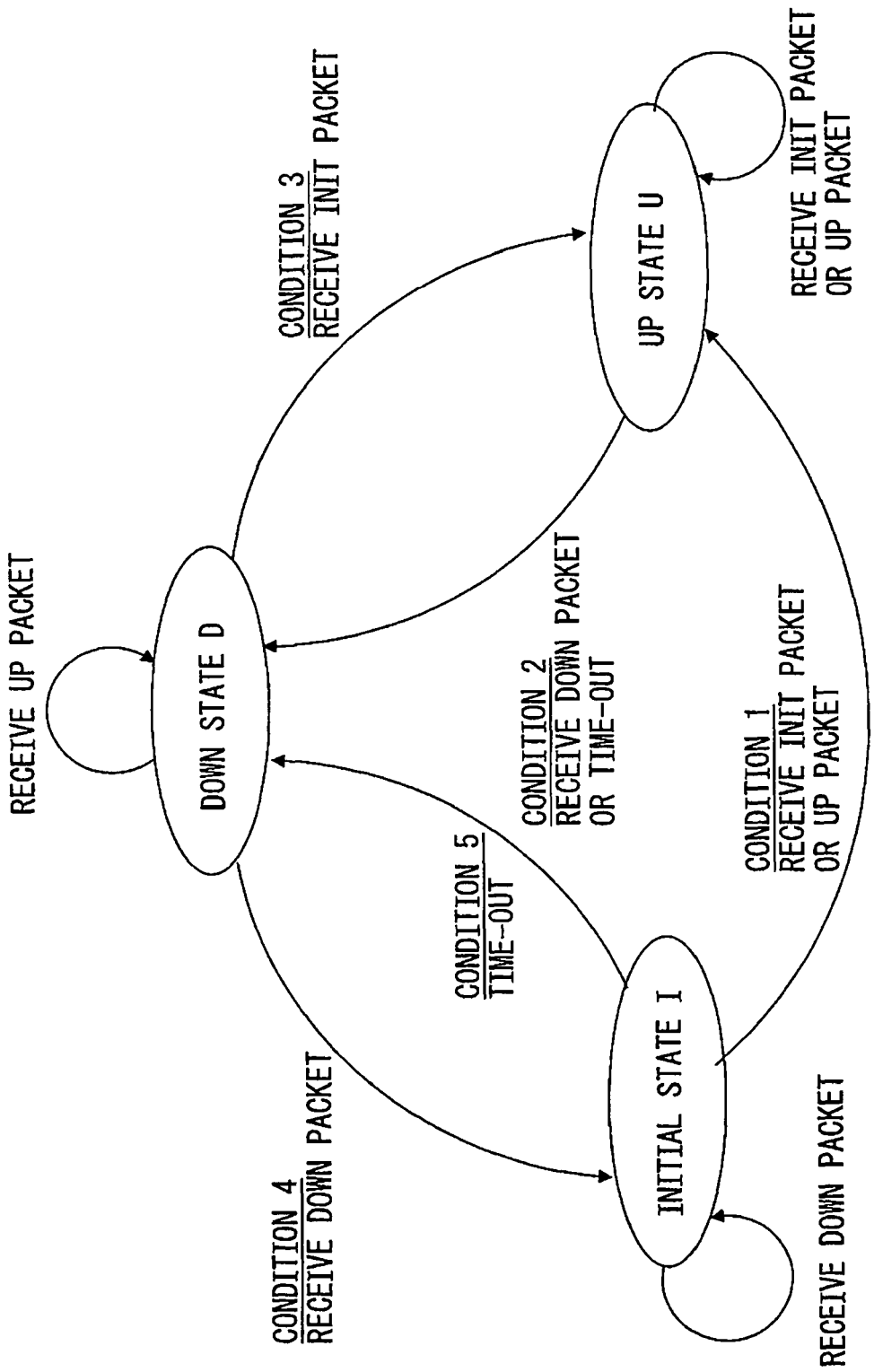
FIG. 18 is a diagram showing a state transition of BFD.

FIG. 18 is a diagram showing a state transition of BFD. The discrimination of packets of INIT, UP, and DOWN in the figure is represented by Stabit in FIG. 17. The initial state I and up state U are communication enable states, and the down state D is a communication disable state. When the condition 1 is satisfied, the state transits from the state I to the state U. Further, when the condition 2 occurs, the state transits from the state U to the state D, while when the condition 3 is satisfied, the state returns from the state D to the state U. The other state transition is explained in the same way.

First, in the initial state I, when the initial packet (INT packet) is received or the UP packet is received (condition 1), the state transits to the up state U. The up state U is maintained so long as the INT packet or UP packet is continuously received.

In this up state U, when a DOWN packet is received or a time-out occurs upon receipt of neither the INT packet nor UP packet (condition 2), the state transits to the down state D. At this time, so long as the UP packet is received, the down state D is retained. Here, if the INT packet is received (condition 3), the state returns to up state U again.

In the above-described down state D, assuming that the DOWN packet is received (condition 4), the state returns to the aforesaid initial state I. The initial state I is retained so long as the DOWN packet is received. On the other hand, in this initial state I, when a time-out occurs without receiving any of a INT packet, DOWN packet, and UP packet (condition 5), the state returns to the down state D again.

When the VRPR network #D maintains the up state U, but failures occur on one side and the other side of the network #D as shown in FIG. 15, a time-out of the above condition 2 occurs, and the self node #3C (and the node #4F on the other party) becomes the above down state D.

Here, the ring switching from #D to #E starts, both nodes #D and #E receive INT packets, and communication between these nodes becomes possible. Here, the transmission/reception between nodes #3C and #4F of the above-described BFD packet is started again, and the switching to #E is completed. After that, by satisfying the above condition 3 or satisfying the above condition 4, the system once enters the initial state I. Further, by satisfying the condition 1, the system enters the up state U.

As explained above, according to Embodiment 2, in a service (connection between user networks) spanning two ring networks, a high failure tolerance can be maintained.

Embodiment 3

In Embodiment 2 mentioned above, the interface node autonomously selects the VRPR network by the keep alive packet. However, it is desirable for the user to be able to select a VRPR network optionally so as to achieve an operation confirmation test at the time of the initial connection of the user network, for a maintenance of the network, or for an investigation of failure.

Therefore, functions of manual switching and forcible switching are further introduced in the above-described keep alive switch control unit 381. Such ring switching must be synchronously carried out between the interface nodes (#3C and #4F). For this reason, the keep alive switch control unit 381 in each node is provided with a protocol processing function for that synchronous switching.

Figure 19:
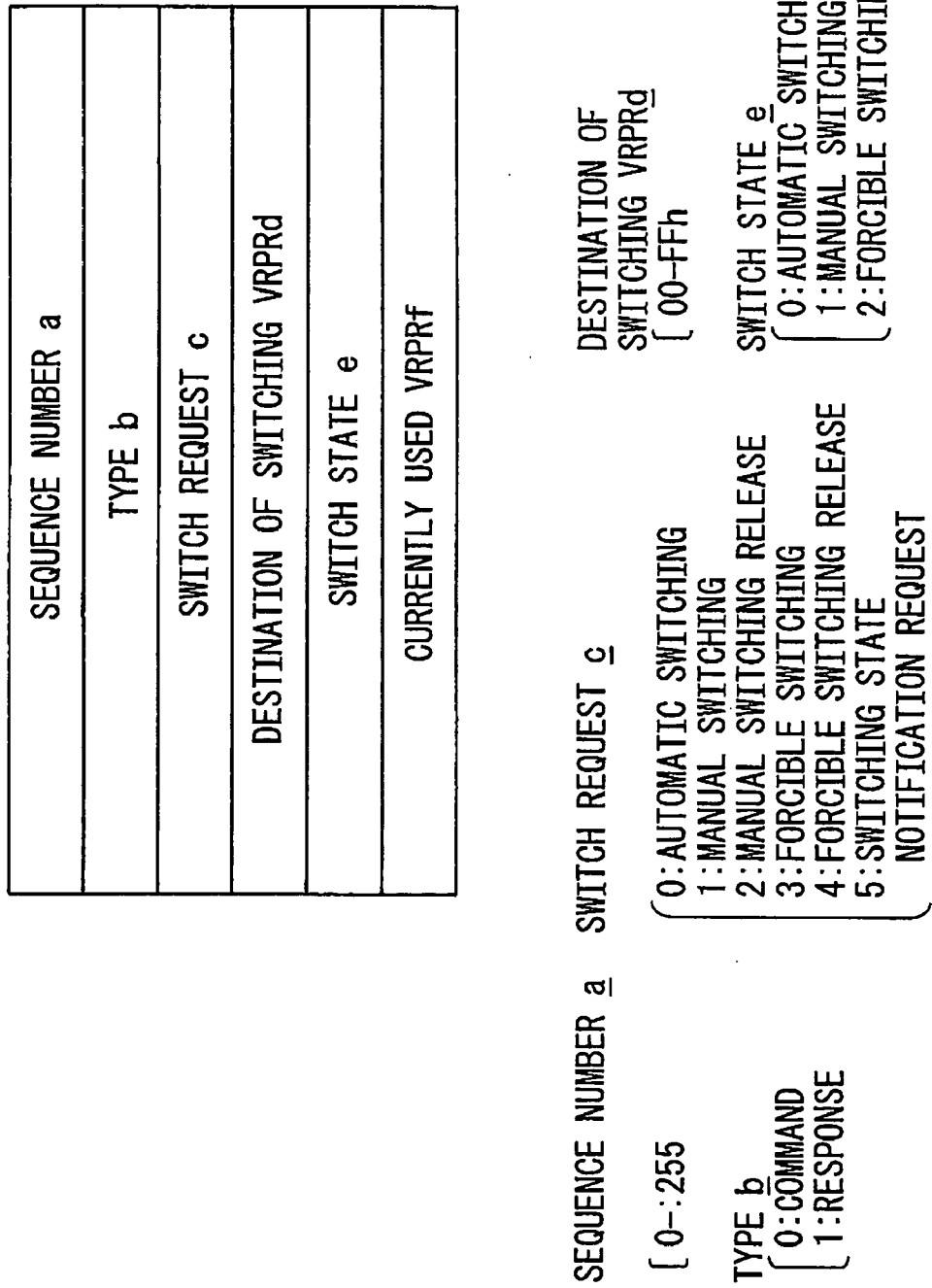
FIG. 19 is a diagram showing a format of a switch command message transferred between keep alive switch control units of two interface nodes.

FIG. 19 is a diagram showing the format of a switch command (see FIG. 14) message transferred between keep alive switch control units of two interfaces. Sequence number a in the figure is a field which is incremented whenever a packet is transmitted for discriminating the message.

Type b in the figure is a field for discriminating whether the message is a command or a response with respect to the command. Switch request c in the figure is a field for discriminating whether the command is a manual switching request, manual switching release request, forcible switching request, forcible switching release request, or switching state notification request. Further, the switched VRPR in the figure is a field for designating a destination of switching in the case where the command is the manual switching request or forcible switching request.

The switching state e in the figure is a field for showing the switching state where the above type b indicates a response. A current used VRPRf in the figure is a field for showing VRPR now selected in the case where the type b indicates a response.

Note that the message of the switch command described above is transmitted with respect to all VRPRs configuring the VRPR redundancy. Accordingly, in the keep alive switch control unit on the reception side, a plurality of the same switch command messages are received, therefore the switch command messages are discriminated according to the sequence numbers a in these switch command messages. If the message has been already received, the related switch command message is discarded.

As explained above, according to Embodiment 3 described above, in a service (connection between user networks) spanning two ring networks, a high maintainability can be maintained.

The packet network systems shown in Embodiments 1, 2, and 3 described above can be grasped as network redundancy formation method as well. Below, the processes forming the method will be shown, while classifying nodes into packet transmission nodes, packet relay nodes, and packet reception nodes.

In the packet transmission nodes of all packet networks configured by a plurality of ring networks and redundancy networks for transferring packets, the method includes (A) a first transmission process of transmitting a message packet including a virtual resilient packet ring network identifier (VRPR ID) for identifying a plurality of virtually defined virtual resilient packet ring (VRPR) networks, (B) a table setting process of setting a ring topology table for each ring network based on that VRPR ID, and (C) a second transmission process of transmitting the packet to the corresponding VRPR network according to the VRPR ID.

In the packet relay nodes of the packet network, the method further includes (D) a first reception process of allocating the received message packet for each corresponding VRPR network based on the VRPR ID when relaying the above-described message packet and (E) a third transmission process of transmitting the related message packet to the VRPR network to which the message packet is allocated.

In the packet reception nodes on packet networks, the method further includes (F) a second reception process of allocating the received message packet for each corresponding VRPR network based on the VRPR ID when relaying the above-described message packet and (G) a third reception process of receiving the allocated message packet.

Further, in each above node, the method further has (H) a monitoring process of monitoring an abnormal state of the VRPR network and (I) a selecting/switching process of selecting a VRPR network other than the abnormal VRPR network and switching when detecting that abnormal state in the monitoring process (H). In this selecting/switching process (I), mutually synchronized switch processing is carried out between nodes which are in communication.

Finally, a system configuration which is different from that of the packet network system shown in FIG. 1 will be shown.

Figure 20:
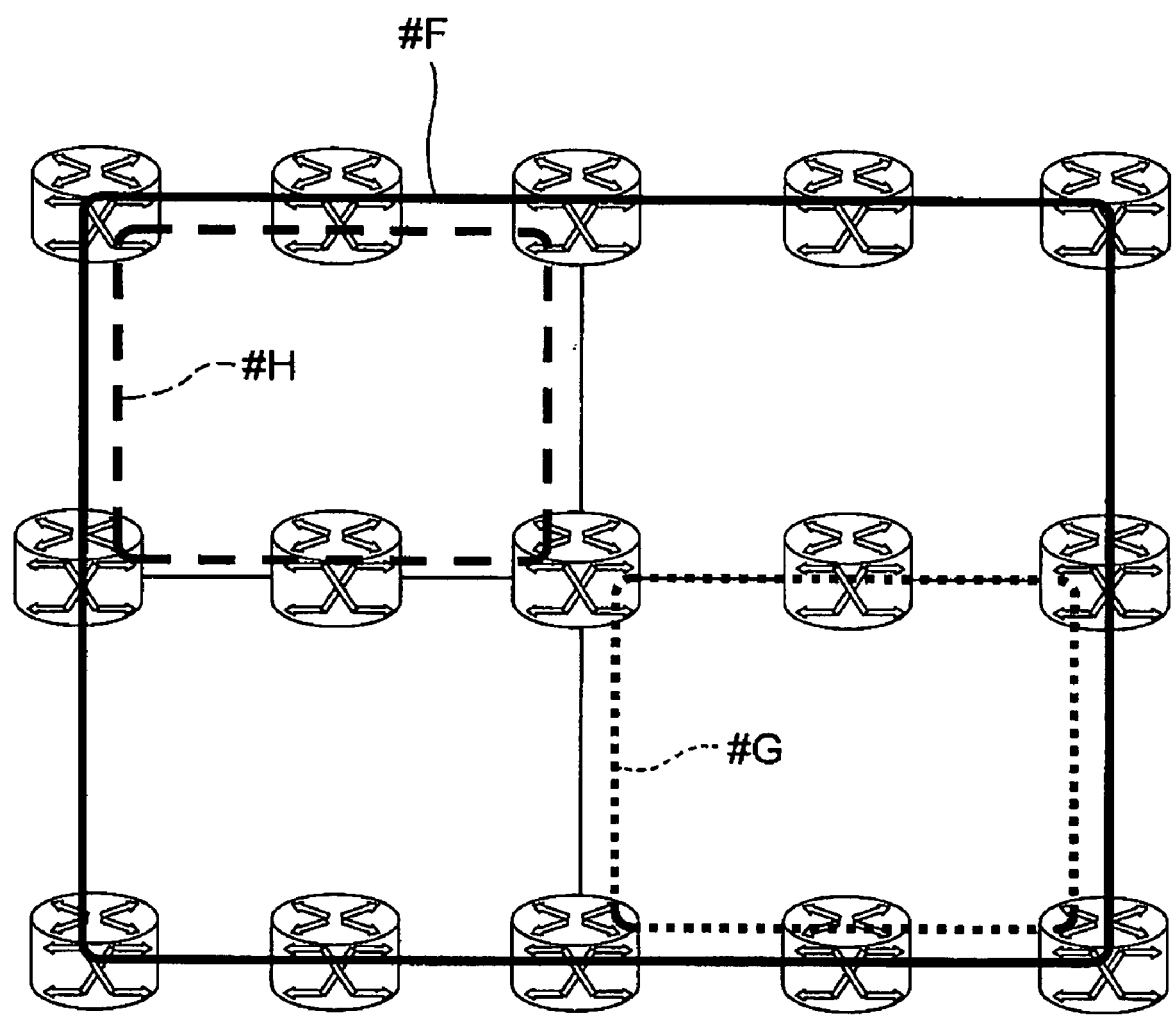
FIG. 20 is a diagram showing an example of the configuration of another network system different from FIG. 1.
Figure 21:
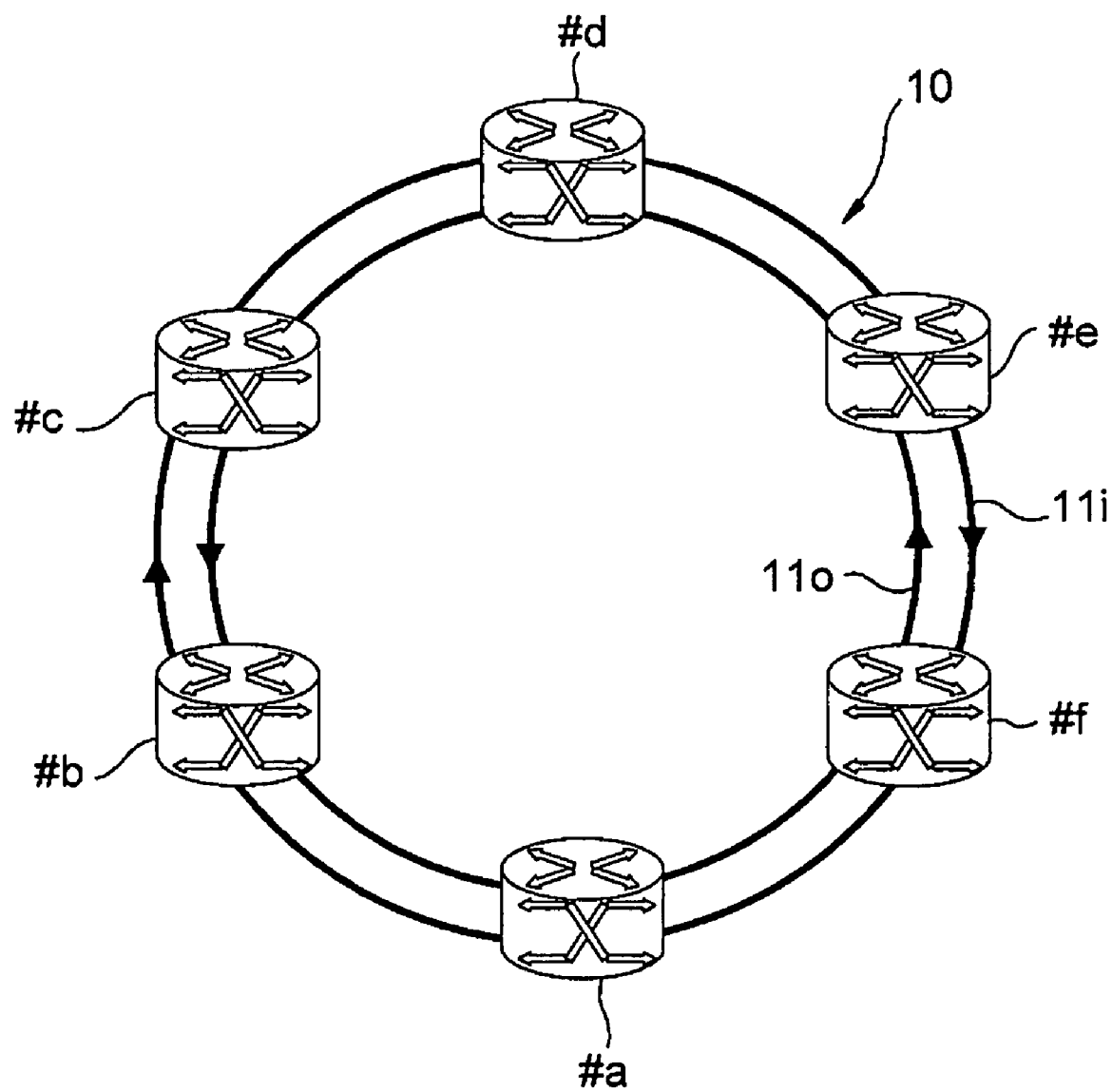
FIG. 21 is a diagram showing a conventional RPR network.
Figure 22:
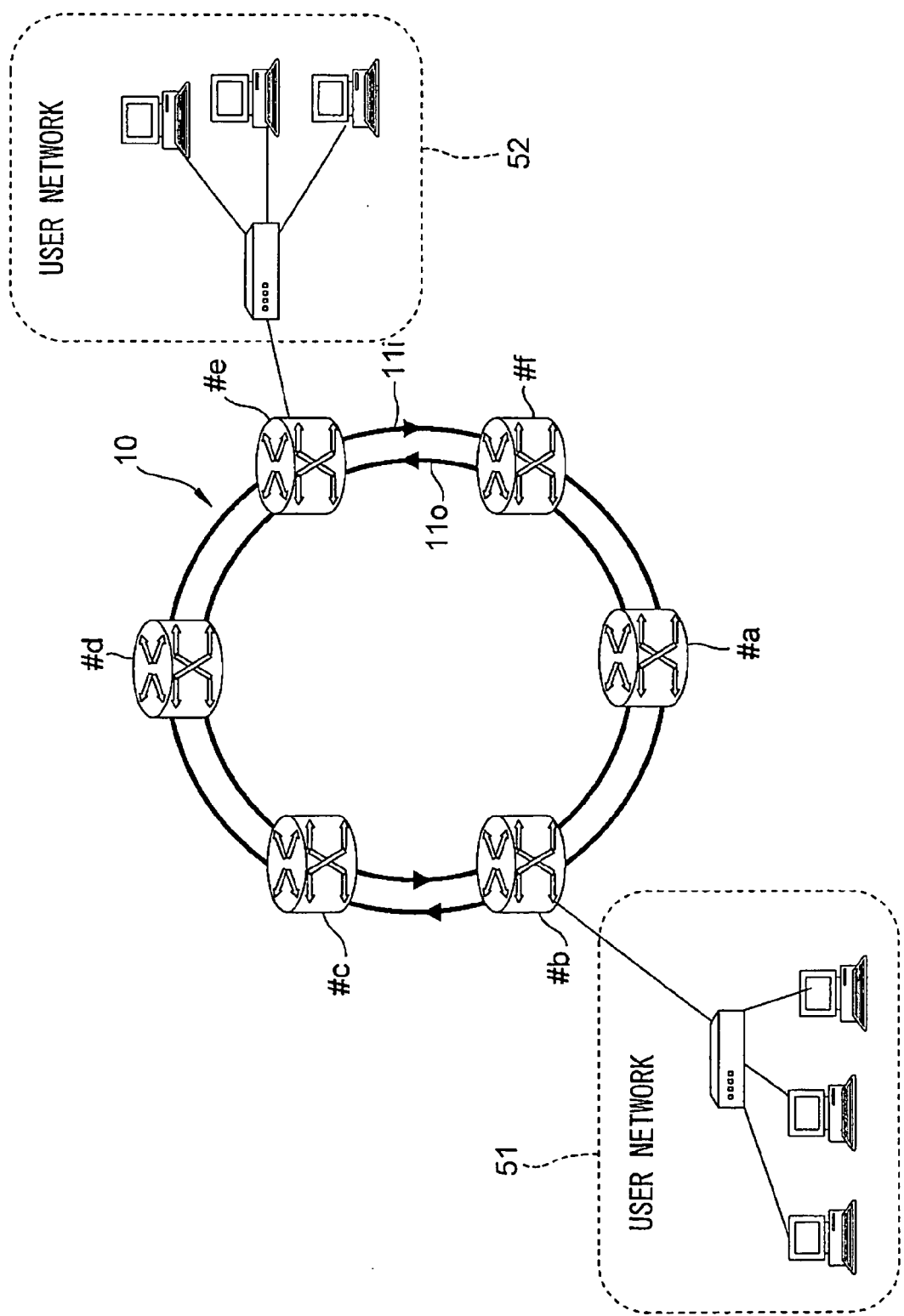
FIG. 22 is a diagram showing an example of the configuration of a network system using a conventional RPR network.
Figure 23:
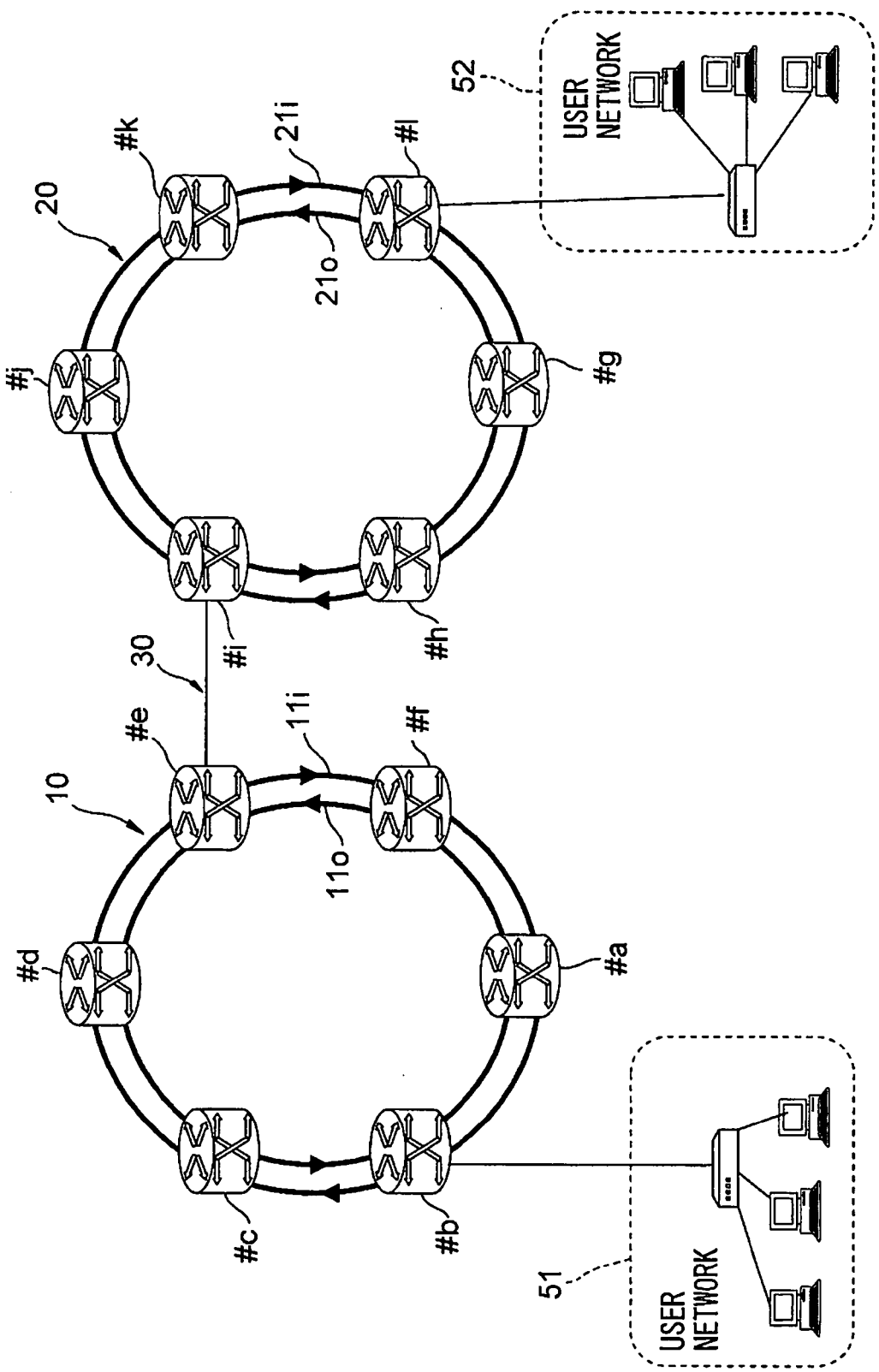
FIG. 23 is a diagram showing an example of the configuration of a network system comprised of two user networks connected to different two RPR networks.
Figure 24:
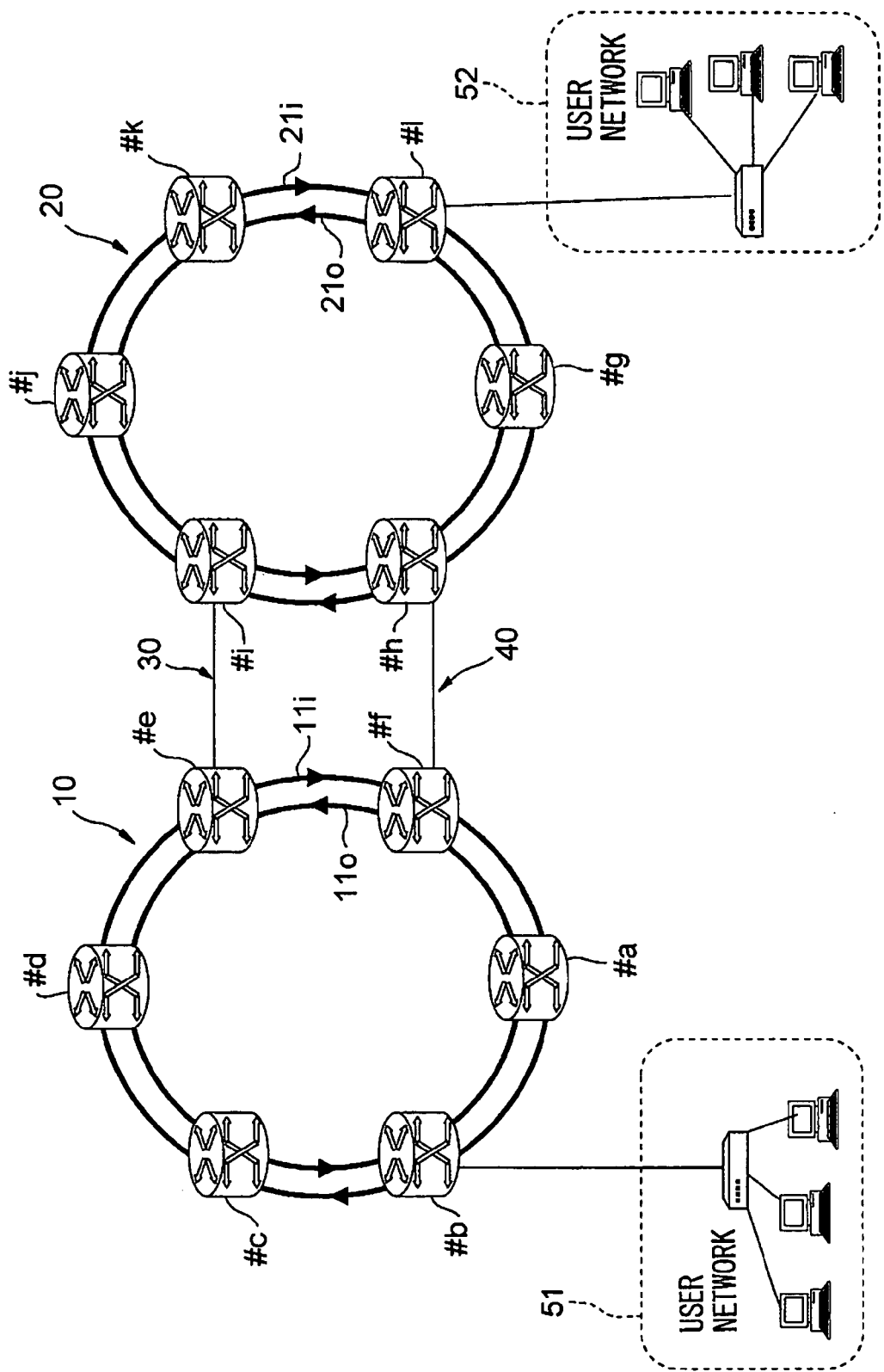
FIG. 24 is a diagram showing an example of the configuration of a network system using inter-RPR network connection including node redundancy.

FIG. 20 is a diagram showing an example of the configuration of the other system different from FIG. 1.

In the system configuration of FIG. 1 mentioned before, the topology of the network was expressed by the inter-ring connection for two ring networks #1 and #2. In this case, in each gateway node, interface portions thereof are separated by two ring interfaces (R0, R1) and one line interface (L0).

However, from a viewpoint of the VRPR, all of the ring interfaces and line interfaces and redundant interfaces are all equivalent. This being so, as shown in FIG. 20, even in a network system where the network topology forms meshes, the VRPR network of the embodiments can also be applied. Due to this, flexible network design becomes possible.

As explained in detail above, the node and packet ring network system based on the embodiments is advantageous when performing node redundancy switching among a plurality of packet ring networks.

While the invention has been described with reference to specific embodiments chosen for purpose of illustration, it should be apparent that numerous modifications could be made thereto by those skilled in the art without departing from the basic concept and scope of the invention.

What is claimed is:

1. A packet network system comprising
a plurality of ring networks including at least two ring networks which are independently and separately constructed and transfer packets,
at least one redundancy network linking said at least two ring networks,
a plurality of virtual resilient packet ring (VRPR) networks, each of which is virtually defined independently in respective said at least two ring networks, and
another virtual resilient packet ring (VRPR) network virtually defined for a ring network which is formed through said at least two ring networks and said at least one redundancy network, and
said packets are transferred through any designated one of said virtual resilient packet ring networks via a gateway node,
said gateway node comprising
an identifier detection function unit to detect a virtual resilient packet ring network identifier included in a packet transmitted/received in said ring network and a virtual resilient ring network identifier of a packet transmitted/received with said redundancy network,
a virtual ring network control function unit to monitor a packet for each virtual resilient packet ring network identifier detected by said identifier detection function unit and control switching of the virtual resilient packet ring, the virtual ring network control function unit including a ring topology table for each virtual resilient packet ring network for identifying topologies of said virtual resilient ring network and including, for each virtual resilient ring network, a virtual data path unit for transmitting/receiving a control packet with said ring topology table to pass the relay packet therethrough, and
a packet output unit to transmit a control packet and relay packet from said virtual data path unit to a predetermined ring network or redundancy network according to the content of said ring topology table.

2. The packet network system as set forth in claim 1, each defined virtual resilient packet ring network is identified by a virtual resilient packet ring network identifier allocated to each.

3. The packet network system as set forth in claim 2, said virtual resilient packet ring network identifier is included in a header of a packet, and the packet is transferred through a virtual resilient packet ring network corresponding to the virtual resilient packet ring network identifier.

4. The packet network system as set forth in claim 1, provision is made of gateway nodes arranged at connection points with said redundancy networks as at least one type of a plurality of nodes configuring said ring networks.

5. The packet network system as set forth in claim 1, provision is made of interface nodes arranged at connection points with user networks on the user side as at least one type of a plurality of nodes configuring said ring networks.

6. The packet network system as set forth in claim 1, provision is made of relay nodes relaying said packets transferred through the ring networks as at least one type of a plurality of nodes configuring said ring networks.

7. A gateway node configuring part of a ring network in a packet network system comprising:
   a plurality of ring networks including at least two ring networks which are independently and separately constructed and transfer packets;
   at least one redundancy network linking said at least two ring networks;
   a plurality of virtual resilient packet ring (VRPR) networks, each of which is virtually defined independently in respective said at least two ring networks; and
   another virtual resilient packet ring (VRPR) network virtually defined for a ring network which is formed through said at least two ring networks and said at least one redundancy network, and
   said packets are transferred through any designated one of said virtual resilient packet ring networks, via the gateway node
   said gateway node comprising
      an identifier detection function unit to detect a virtual resilient packet ring network identifier included in a packet transmitted/received in said ring network and a virtual resilient ring network identifier of a packet transmitted/received with said redundancy network,
      a virtual ring network control function unit to monitor a packet for each virtual resilient packet ring network identifier detected by said identifier detection function unit and control switching of the virtual resilient packet ring, the virtual ring network control function unit including a ring topology table for each virtual resilient packet ring network for identifying topologies of said virtual resilient ring network and including, for each virtual resilient ring network, a virtual data path unit for transmitting/receiving a control packet with said ring topology table to pass the relay packet therethrough, and
      a packet output unit to transmit a control packet and relay packet from said virtual data path unit to a predetermined ring network or redundancy network according to the content of said ring topology table.

8. An interface node linking with a user network and configuring part of a ring network in a packet network system comprising:
   a plurality of ring networks including at least two ring networks which are independently and separately constructed and transfer packets;
   at least one redundancy network linking said at least two ring networks;
   a plurality of virtual resilient packet ring (VRPR) networks, each of which is virtually defined independently in respective said at least two ring networks; and
   another virtual resilient packet ring (VRPR) network virtually defined for a ring network which is formed through said at least two ring networks and said at least one redundancy network, and said packets are transferred through any designated one of said virtual resilient packet ring networks via a gateway node,
   said interface node comprising
      an identifier detection function unit to detect a virtual resilient packet ring network identifier included in a packet transmitted/received in the ring network;
      a virtual ring network control function unit to monitor a packet for each virtual resilient packet ring network identifier detected by said identifier detection function unit and control switching of the virtual resilient packet ring; and
      a packet processing unit to apply a transform/inverse transform to a packet format for each said virtual resilient packet ring network with said user network, and further
   said gateway node comprising
      an identifier detection function unit to detect a virtual resilient packet ring network identifier included in a packet transmitted/received in said ring network and a virtual resilient ring network identifier of a packet transmitted/received with said redundancy network,
      a virtual ring network control function unit to monitor a packet for each virtual resilient packet ring network identifier detected by said identifier detection function unit and control switching of the virtual resilient packet ring, the virtual ring network control function unit including a ring topology table for each virtual resilient packet ring network for identifying topologies of said virtual resilient ring network and including, for each virtual resilient ring network, a virtual data path unit for transmitting/receiving a control packet with said ring topology table to pass the relay packet therethrough, and
      a packet output unit to transmit a control packet and relay packet from said virtual data path unit to a predetermined ring network or redundancy network according to the content of said ring topology table.

9. The interface node as set forth in claim 8, wherein said virtual ring network control function unit has a ring topology table for each virtual resilient packet ring network for defining topologies of said virtual resilient packet ring networks.

10. The interface node as set forth in claim 9, said virtual ring network control function units have, for each said virtual resilient packet ring network, a virtual data path unit for transmitting/receiving a control packet with a corresponding ring topology table and passing the relay packet therethrough.

11. The interface node as set forth in claim 10, having a VRPR selection unit, for each virtual resilient packet ring network, connecting with said virtual data path unit and a switch control unit for indicating the VRPR selection in accordance with a ring switch command.

12. A relay node configuring part of a ring network in a packet network system comprising:
   a plurality of ring networks including at least two ring networks which are independently and separately constructed and transfer packets;
   at least one redundancy network linking said at least two ring networks;
   a plurality of virtual resilient packet ring (VRPR) networks, each of which is virtually defined independently in respective said at least two ring networks; and
   another virtual resilient packet ring (VRPR) network virtually defined for a ring network which is formed through said at least two ring networks and said at least one redundancy network, and
   said packets are transferred through any designated one of said virtual resilient packet ring networks via a gateway node, said relay node comprising
an identifier detection function unit to detect a virtual resilient packet ring network identifier included in a packet transmitted/received in the ring network and
a virtual ring network control function unit to monitor a packet for each virtual resilient packet ring network identifier detected by said identifier detection function unit and control switching of the virtual resilient packet ring and having a ring topology table for each virtual resilient packet ring network for defining the topology of said virtual resilient packet ring network, and further
said gateway node comprising
an identifier detection function unit to detect a virtual resilient packet ring network identifier included in a packet transmitted/received in said ring network and a virtual resilient ring network identifier of a packet transmitted/received with said redundancy network,
a virtual ring network control function unit to monitor a packet for each virtual resilient packet ring network identifier detected by said identifier detection function unit and control switching of the virtual resilient packet ring, the virtual ring network control function unit including a ring topology table for each virtual resilient packet ring network for identifying topologies of said virtual resilient ring network and including, for each virtual resilient ring network, a virtual data path unit for transmitting/receiving a control packet with said ring topology table to pass the relay packet therethrough, and
a packet output unit to transmit a control packet and relay packet from said virtual data path unit to a predetermined ring network or redundancy network according to the content of said ring topology table.

13. A method of forming network redundancy at each of packet transmission nodes in a packet network system comprising: a plurality of ring networks including at least two ring networks which are independently and separately constructed and transfer packets; at least one redundancy network linking said at least two ring networks; a plurality of virtual resilient packet ring (VRPR) networks, each of which is virtually defined independently in respective said at least two ring networks; and another virtual resilient packet ring (VRPR) network virtually defined for a ring network which is formed through said at least two ring networks and said at least one redundancy network, and said packets are transferred through any designated one of said virtual resilient packet ring networks via a gateway node, the gateway node comprising: an identifier detection function unit to detect a virtual resilient packet ring network identifier included in a packet transmitted/received in said ring network and a virtual resilient ring network identifier of a packet transmitted/received with said redundancy network; a virtual ring network control function unit to monitor a packet for each virtual resilient packet ring network identifier detected by said identifier detection function unit and control switching of the virtual resilient packet ring, the virtual ring network control function unit including a ring topology table for each virtual resilient packet ring network for identifying topologies of said virtual resilient ring network and including, for each virtual resilient ring network, a virtual data path unit for transmitting/receiving a control packet with said ring topology table to pass the relay packet therethrough; and a packet output unit to transmit a control packet and relay packet from said virtual data path unit to a predetermined ring network or redundancy network according to the content of said ring topology table, said method comprising a first transmission process of transmitting a message packet including a virtual resilient packet ring network identifier for identifying a plurality of virtually defined virtual resilient packet ring networks;
a table setting process of setting a ring topology table for each ring network based on said virtual resilient packet ring network identifier; and
a second transmission process of transmitting said packet to said corresponding virtual resilient packet ring network according to said virtual resilient packet ring network identifier.

14. The method of forming network redundancy as set forth in claim 13, in each packet relay node of said packet networks, comprising:
a first reception process of allocating a received message packet for each corresponding virtual resilient packet ring network based on said virtual resilient packet ring network identifier when relaying said message packet and
a third transmission process of transmitting the message packet to the virtual resilient packet ring network to which said message packet is allocated.

15. The method of forming network redundancy as set forth in claim 14, in each packet reception node of said packet networks, comprising:
a second reception process of allocating a received message packet for each corresponding virtual resilient packet ring network based on said virtual resilient packet ring network identifier when relaying said message packet and
a third reception process of receiving the allocated related message packet.

16. The method of forming network redundancy as set forth in claim 15, in each node, further comprising:
a monitoring process of monitoring an abnormal state of said virtual resilient packet ring network and
a selecting/switching process of selecting a virtual resilient packet ring network other than the abnormal virtual resilient packet ring network and switching when detecting said abnormal state in said monitoring process.

17. The method of forming network redundancy as set forth in claim 16, said selecting/switching process is carried out by mutually synchronized switching between nodes being in communication.

* * * * *